United States Patent
Hiramoto et al.

(10) Patent No.: US 9,619,300 B2
(45) Date of Patent: Apr. 11, 2017

(54) REDUCTION OPERATION DEVICE, A PROCESSOR, AND A COMPUTER SYSTEM

(75) Inventors: Shinya Hiramoto, Kawasaki (JP); Yuichiro Ajima, Kawasaki (JP); Tomohiro Inoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 13 days.

(21) Appl. No.: 13/166,114

(22) Filed: Jun. 22, 2011

(65) Prior Publication Data
US 2012/0060019 A1 Mar. 8, 2012

(30) Foreign Application Priority Data

Sep. 8, 2010 (JP) ................................. 2010-200807

(51) Int. Cl.
*G06F 9/52* (2006.01)
*G06F 9/30* (2006.01)

(52) U.S. Cl.
CPC ............... *G06F 9/522* (2013.01); *G06F 9/30* (2013.01)

(58) Field of Classification Search
None
See application file for complete search history.

(56) References Cited

U.S. PATENT DOCUMENTS

| 8,654,798 B2* | 2/2014 | Hiramoto | G06F 9/522 370/328 |
|---|---|---|---|
| 2008/0104367 A1 | 5/2008 | Blumrich et al. | |
| 2008/0147881 A1* | 6/2008 | Krishnamurthy | H04L 45/12 709/238 |
| 2010/0124241 A1* | 5/2010 | Hiramoto | G06F 9/522 370/509 |
| 2011/0078417 A1* | 3/2011 | Fahs | G06F 9/30145 712/216 |
| 2012/0060019 A1* | 3/2012 | Hiramoto | G06F 9/522 712/221 |

(Continued)

FOREIGN PATENT DOCUMENTS

| EP | 0 924 601 | 6/1999 |
|---|---|---|
| EP | 2 189 903 A2 | 10/2009 |

(Continued)

OTHER PUBLICATIONS

Japanese Office Action dated Apr. 1, 2014 in corresponding Japanese Application No. 2010-20080.

(Continued)

*Primary Examiner* — Marsha D Banks Harold
*Assistant Examiner* — Christopher Wyllie
(74) *Attorney, Agent, or Firm* — Staas & Halsey LLP

(57) ABSTRACT

A reduction operation device detects a non-correspondence of an operation type or a data type in a reduction arithmetic operation of a parallel processing. The reduction operation device is inputted a plurality of the synchronization signals and data, sets each transmission destinations of the plurality of inputted synchronization signals and the plurality of data corresponding to a next stage of a reduction operation and executes the reduction operation. The synchronization unit in the reduction operation device detects the non-correspondence between the operation type or the data type included in an instruction of the reduction operation after the synchronization is established and controls the arithmetic operation of the arithmetic unit.

15 Claims, 15 Drawing Sheets

(56) References Cited

U.S. PATENT DOCUMENTS

| | | | | |
|---|---|---|---|---|
| 2012/0159019 A1* | 6/2012 | Inoue | ............... | G06F 15/17325 710/58 |
| 2014/0040558 A1* | 2/2014 | Ajima | .................. | G06F 15/173 711/130 |

FOREIGN PATENT DOCUMENTS

| | | | | |
|---|---|---|---|---|
| EP | 1 189 903 A2 | 5/2010 | | |
| EP | 2189903 A2 * | 5/2010 | | |
| JP | 3-98152 | 4/1991 | | |
| JP | 7-152712 | 6/1995 | | |
| JP | 2001-43203 | 2/2001 | | |
| JP | EP 2189903 A2 * | 5/2010 | ............. | G06F 9/522 |
| JP | 2010-122848 | 6/2010 | | |

OTHER PUBLICATIONS

Chinese Office Action issued Nov. 22, 2013 for Chinese Application No. 201110201689.0.

C. Falzone et al., "Collective Error Detection for MPI Collective Operations," *Lecture Notes in Computer Science (LNCS)*, No. 3666, Jan. 2005, pp. 138-147.

D. Buntinas et al., "NIC-Based Reduction in Myrinet Clusters: Is It Beneficial?" Feb. 2002, pp. 1-11.

B. Arimilli et al., "The PERCS High-Performance Interconnect," *IEEE 18th Annual Symposium on High Performance Interconnects (HOTI)*, Piscataway, NJ, USA, Aug. 18, 2010, pp. 75-82.

Y. Ajima et al., "Tofu:A 6D Mesh/Torus Interconnect for Exascale Computers", *IEEE Computer*, IEEE Computer Society, US, vol. 42, No. 11, Nov. 2009, pp. 36-48.

Extended European Search Report mailed on Nov. 10, 2014 for corresponding European Application No. 11170442.5.

J.-P. Prost et al., "Towards a High-Performance and Robust Implementation of MPI-IO on top of GPFS", Submitted to Europar 2000 in Jan. 2000, pp. 1-29.

Patrick Ohly et al., "Automated MPI Correctness Checking What if there was a magic option?", Jan. 2007, pp. 1-30.

\* cited by examiner

FIG. 16

| OPERATION TYPE | DATA TYPE | DESTINATION NODE ADDRESS | DESTINATION CONTROL REGISTER NUMBER | |
|---|---|---|---|---|
| NODE ADDRESS OCCURED NON-CORRESPONDENCE | | CONTROL REGISTER NUMBER OCCURED NON-CORRESPONDENCE | DATA | |

REDUCTION OPERATION DEVICE, A PROCESSOR, AND A COMPUTER SYSTEM

CROSS-REFERENCE TO RELATED APPLICATIONS

This application is based upon and claims the benefit of priority of the prior Japanese Patent Application No. 2010-200807, filed on Sep. 8, 2010, the entire contents of which are incorporated herein by reference.

FIELD

The embodiments of the invention discussed herein are related to a reduction operation device, a processor and a computer system.

BACK GROUND

A reduction operation is an arithmetic operation for data held by a plurality of processes. As a representative reduction operation, for example, a sum total operation of data and a calculation operation of a maximum value and a minimum value among data are known. There are two cases of the reduction operation. One case is a case to hold a result of the operation on a specific process and a second case is a case to hold the result of the operation on all processes. The reduction operation can be executed by a same algorithm as a barrier synchronization.

The barrier synchronization is a method for synchronizing between the plurality of processes that are parallel processed. In the barrier synchronization, a synchronization point, that is, a barrier point is set. The processing of the process that executes the barrier synchronization halts when the processing of the process reaches the barrier point. And when all processes that are parallel processed and executed the barrier synchronization reach the barrier point, the processing of the halted process restarts.

When the reduction operation executes between a plurality of nodes that perform a parallel arithmetic operation, it is effective to provide a reduction operation device on each nodes. The reduction operation device can execute a several type of operation processes. The reduction operation device judges whether the synchronization of the data is established and executes a specified operation process when the synchronization is established.

While the reduction operation is a process extending to the plurality of nodes and the reduction operation is performed by starting the reduction operation on each of nodes. Since the each node individually designates the operation type and the data type of the reduction operation, it is possibility to cause non-correspondence of the operation type and the data type between the nodes. In order to detect the non-correspondence, it is necessary to communicate the operation type and the data type between the nodes and to confirm the operation type and the data type that the other node designates.

When a CPU (Central Processing Unit) of the node executes the reduction operation by software, it is proposed that the software detects the non-correspondence of the operation type and the data type.

Patent Document

[Patent Document 1] Japanese Laid-open Patent Publication No. 2010-122848]

[Patent Document 2] Japanese Laid-open Patent Publication No. 3-098152

Non Patent Document

[Non Patent Document 1] Authors: PROST J.-P., TREUMANN R., HEDGES R., JIA B., KONIGES A. E., and WHITE A., document: "Towards a High-Performance and Robust Implementation of MPI-IO on top of GPFS", published by National Technical Information Service U.S. Department of commerce, UCRL-LC-137128, Jan. 11, 2000.

[Non Patent Document 2] Authors: Patrick Ohly, Werner Krotz-Vogel, document: "Automated MPI Correctness Checking What if there was a magic option?", published by The $8^{th}$ LCI International Conference on High-Performance Clustered Computing, 2007.

SUMMARY

In a construction to independently provide the reduction operation device to the node, when there is a non-correspondence of the operation type and the data type between nodes, the processing are not completed. Thereby, a hang up is caused or error calculation result is returned. And a debug is difficult in this case.

In a construction to execute the reduction operation by the software, the detection of the non correspondence is detected by communicating the operation type and the data type in addition to the reduction operation data between the nodes. Accordingly, it is necessary to wait the completion of the communication of the operation type and the data type for completing the reduction operation. Therefore, a long processing time is required for the reduction operation.

According to an aspect of the invention, a reduction operation device that is inputted a plurality of synchronization signals and data, sets each transmission destinations of the plurality of inputted synchronization signals and each transmission destinations of the plurality of inputted data corresponding to a next stage of a reduction operation and executes the reduction operation to the inputted data, the reduction device has a synchronization unit that waits inputs of the plurality of synchronization signals and instruction of the reduction operation to the plurality of inputted data, outputs an arithmetic result of the reduction operation and a transmission destination of the plurality of synchronization signals to m (m>1 and m is integer) number of transmission destinations after a synchronization between the plurality of synchronization signals is established, an arithmetic unit that executes an arithmetic operation between n (n>1 and m is integer) number of the inputted data that the synchronization is established, a storage unit that stores data and an arithmetic result, a transmission unit that transmits the plurality of inputted data and the plurality of synchronization signals to the transmission destination designated by the synchronization unit, and a reception unit that sends the plurality of synchronization signals and the plurality of transmission destinations to the synchronization unit and the plurality of inputted data to the storage unit. And the synchronization unit receives the plurality of synchronization signals and at least one of an operation type and a data type included in the inputted instruction of the reduction operation, compares between n number of the operation type or the data type after the synchronization is established, transmits a signal indicating non-correspondence instead of the arithmetic result to m number of transmission destination when the n number of the operation type or the data type do not match, and executes the instruction of the reduction operation when n number of the operation type or the data type match.

Further, according to the other aspect of the invention, a processor has a processing unit and a reduction operation device that is inputted a plurality of synchronization signals and data, sets each transmission destinations of the plurality of inputted synchronization signals and each transmission destinations of the plurality of inputted data corresponding to a next stage of a reduction operation and executes the reduction operation to the inputted data. And the reduction device has a synchronization unit that waits inputs of the plurality of synchronization signals and instruction of the reduction operation to the plurality of inputted data, outputs an arithmetic result of the reduction operation and a transmission destination of the plurality of synchronization signals to m (m>1 and m is integer) number of transmission destinations after a synchronization between the plurality of synchronization signals is established, an arithmetic unit that executes an arithmetic operation between n (n>1 and m is integer) number of the inputted data that the synchronization is established, a storage unit that stores data and an arithmetic result, a transmission unit that transmits the plurality of inputted data and the plurality of synchronization signals to the transmission destination designated by the synchronization unit, and a reception unit that sends the plurality of synchronization signals and the plurality of transmission destinations to the synchronization unit and the plurality of inputted data to the storage unit. And the synchronization unit receives the plurality of synchronization signals and at least one of an operation type and a data type included in the inputted instruction of the reduction operation, compares between n number of the operation type or the data type after the synchronization is established, transmits a signal indicating non-correspondence instead of the arithmetic result to m number of transmission destination when the n number of the operation type or the data type do not match, and executes the instruction of the reduction operation when n number of the operation type or the data type match.

Further, according to the other aspect of the invention, a computer system has a plurality of processors that are connected through a network. Each processor has a processing unit and a reduction operation device that is inputted a plurality of synchronization signals and data, sets each transmission destinations of the plurality of inputted synchronization signals and each transmission destinations of the plurality of inputted data corresponding to a next stage of a reduction operation and executes the reduction operation to the inputted data. And the reduction device has a synchronization unit that waits inputs of the plurality of synchronization signals and instruction of the reduction operation to the plurality of inputted data, outputs an arithmetic result of the reduction operation and a transmission destination of the plurality of synchronization signals to m (m>1 and m is integer) number of transmission destinations after a synchronization between the plurality of synchronization signals is established, an arithmetic unit that executes an arithmetic operation between n (n>1 and n is integer) number of the inputted data that the synchronization is established, a storage unit that stores data and an arithmetic result, a transmission unit that transmits the plurality of inputted data and the plurality of synchronization signals to the transmission destination designated by the synchronization unit, and a reception unit that sends the plurality of synchronization signals and the plurality of transmission destinations to the synchronization unit and the plurality of inputted data to the storage unit. And the synchronization unit receives the plurality of synchronization signals and at least one of an operation type and a data type included in the inputted instruction of the reduction operation, compares between n number of the operation type or the data type after the synchronization is established, transmits a signal indicating non-correspondence instead of the arithmetic result to m number of transmission destination when the n number of the operation type or the data type do not match, and executes the instruction of the reduction operation when n number of the operation type or the data type match.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is an explanatory diagram illustrating a packet of a third embodiment.

DESCRIPTION OF EMBODIMENTS

The embodiments will be explained below in the following order; a computer system, a configuration of a reduction operation device according to a first embodiment, a reduction operation process according to a first embodiment, a configuration of a reduction operation device according to a second embodiment, a reduction operation process according to a second embodiment, a reduction operation process according to a third embodiment, but the disclosed computer system, the node and the reduction operation device are not limited to this embodiments.

(A Computer System)

Figure 1:
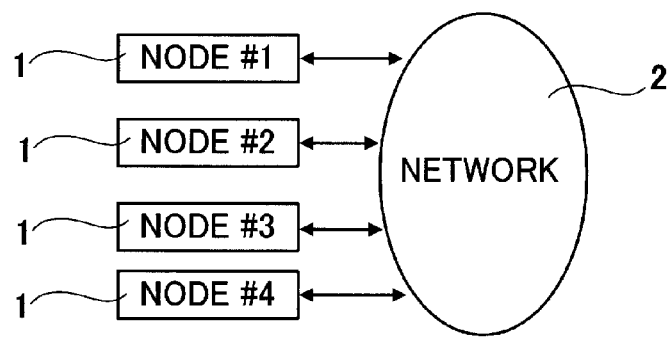
FIG. 1 is a block diagram illustrating a computer system according to an embodiment of the invention.
Figure 2:
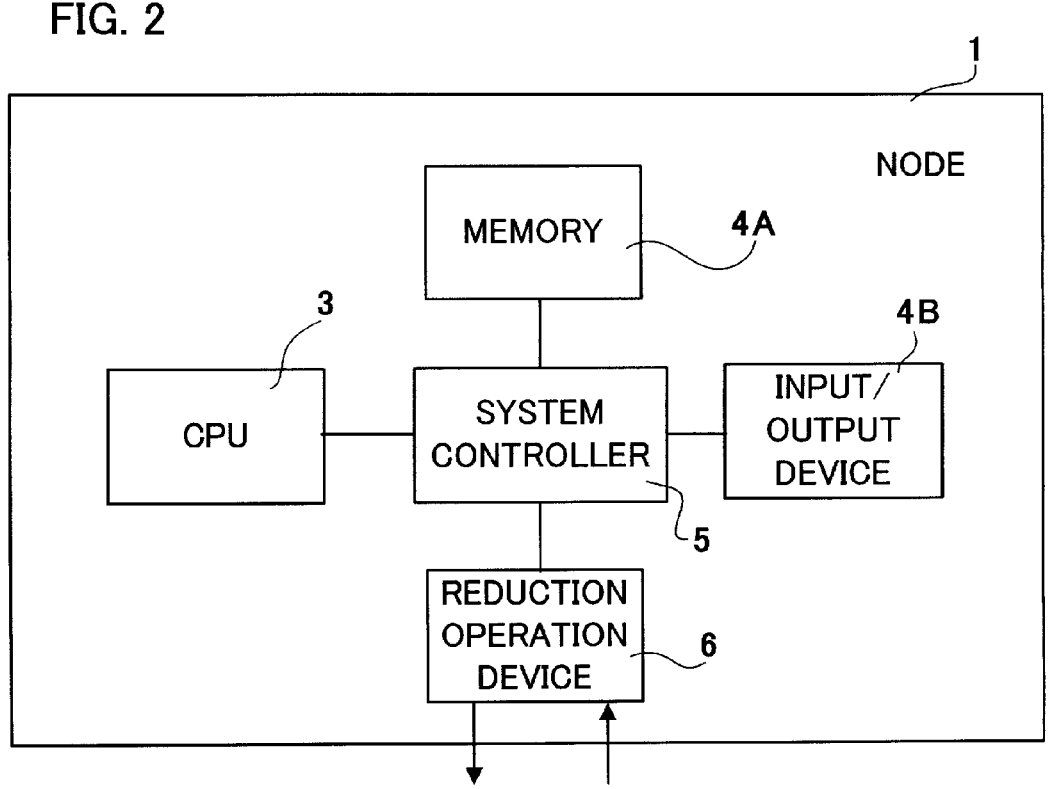
FIG. 2 is a block diagram illustrating a node (processing device) according to an embodiment.

FIG. 1 illustrates a block diagram of a computer system according to an embodiment of the invention. FIG. 2 illustrates a block diagram of a node in FIG. 1. As illustrated in FIG. 1, the computer system includes a plurality of nodes 1 and a network 2 that connects these nodes 1. In the embodiment illustrated in FIG. 1, four nodes #1~4 are connected to a computer network 2. The plurality of nodes 1, which are connected via the network 2, executes a parallel processing (array processing). For example a cross-bar switch is used as the network 2.

As illustrated in FIG. 2, each of the plurality of nodes has an arithmetic processing unit (CPU: Central Processing Unit) 3, a memory 4A, a system controller 5, a reduction operation device 6 and an input and output device 4B. The system controller 5 controls whole operation of the node 1. That is, the system controller 5 controls the CPU 3, the memory 4A, the reduction operation device 6 and the input and output device 4B. The CPU 3 executes a transmission and a reception of necessary data between the input and output device 4B via the system controller 5. That is, the input and output device 4B sets setting conditions including an algorithm of a barrier synchronization and execution conditions to the CPU 3. Further, the input and output device 4B outputs data which is output from the CPU 3, if necessary.

The CPU 3 transmits a signal indicating a start of the reduction operation to the reduction operation device 6 via the system controller 5 and receives a signal indicating a completion of the reduction operation from the reduction operation device 6. Further, the CPU 3 sets a transmission destination, an operation type and data type according to the setting conditions which are input from the input and output device 4B to the reduction operation device 6.

The reduction operation device 6 executes the reduction operation while barrier synchronization is performed. The reduction operation device 6 communicates with a reduction operation device 6 of another node 1 via the network 2 according to the setting conditions and executes the reduction operation including the barrier synchronization.

Further, the CPU 3 transmits and receives necessary data to/from the memory 4A via the system controller 5. The CPU 3 writes the data on the memory 4A and reads the data from the memory 4A. These data are data for use of the reduction operation in the reduction operation device as explained later.

Figure 3:
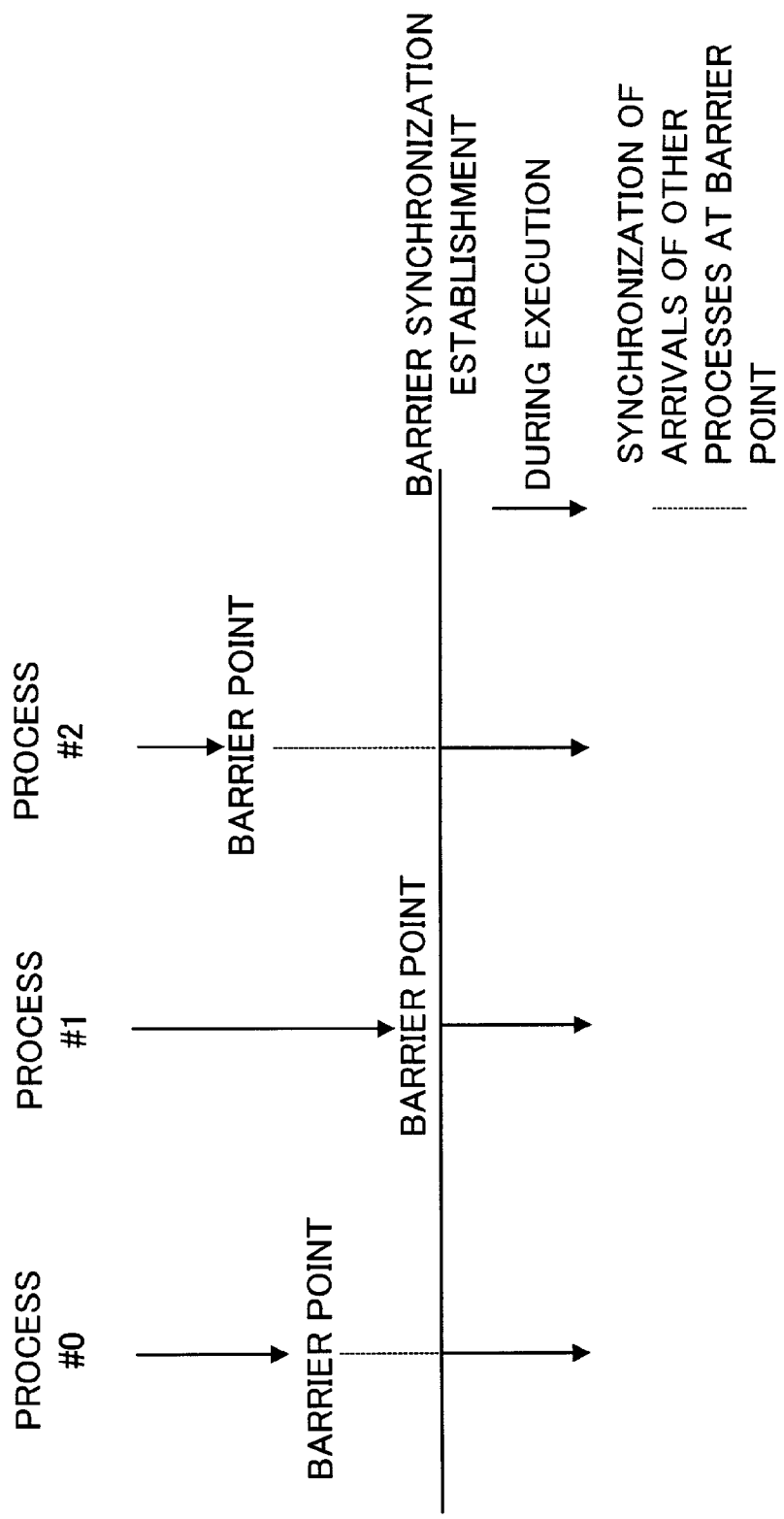
FIG. 3 is a diagram illustrating an explanation of barrier synchronization according to an embodiment.
Figure 4:
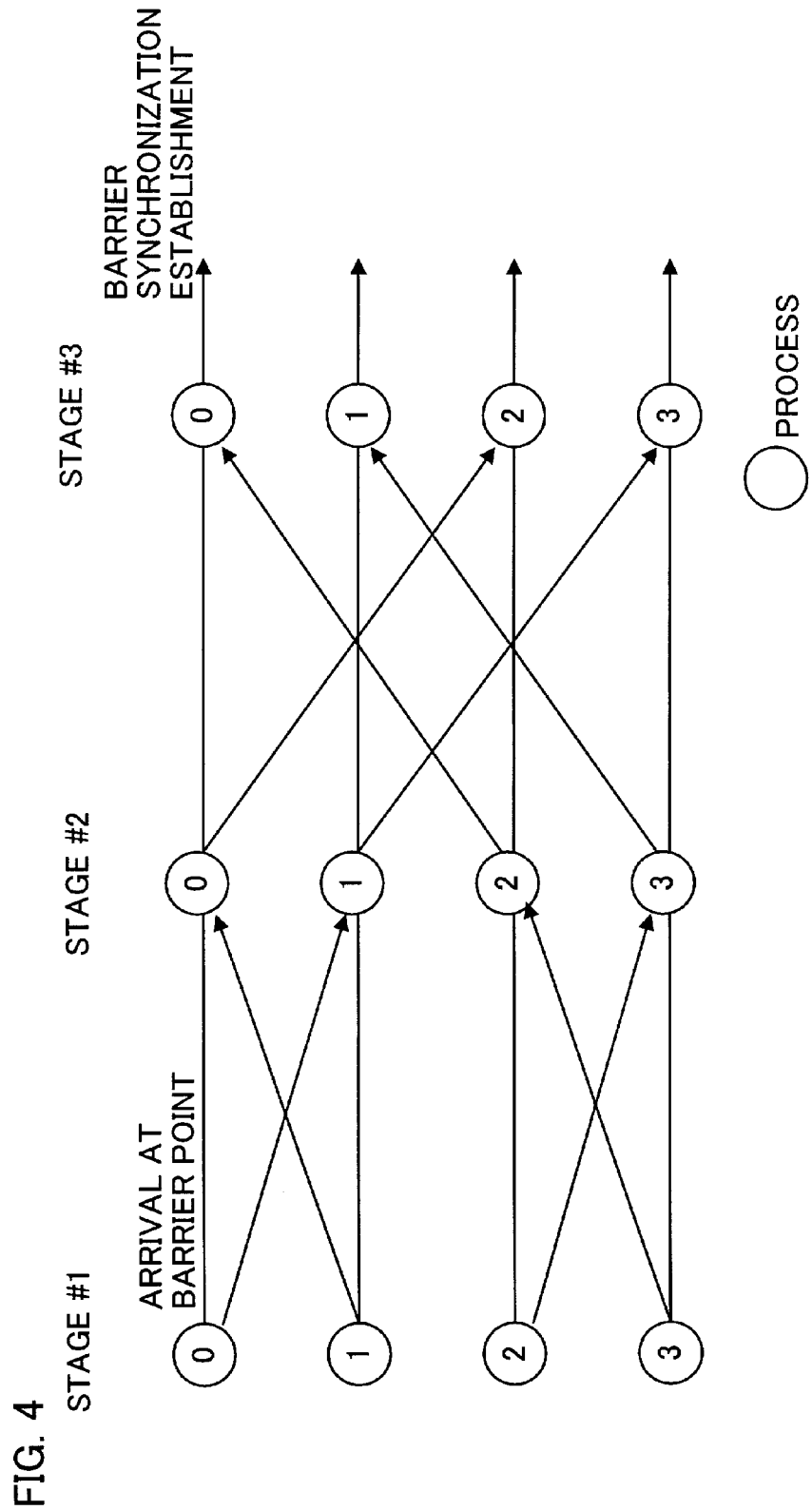
FIG. 4 is a diagram illustrating an explanation of an example of the barrier synchronization by a butterfly between four processes according to FIG. 3.

Here, the barrier synchronization of the reduction operation device will be briefly explained as below. FIG. 3 illustrates an explanation diagram of the barrier synchronization between three processes #0~#2. FIG. 4 illustrates an explanation diagram indicating an example of the barrier synchronization between four processes #0~#3.

As illustrated in FIG. 3, a plurality of processes #0~#2, which execute the barrier synchronization operation, stops the execution of its own process when the execution of the processes arrived at a point at which the processes are synchronized (called as a barrier point). That is, each of the plurality of processes #0~#2 waits until the other process arrived the barrier point when one or two processes #0~#2 itself arrived the barrier point.

A plurality of processes #0~#2, which execute the barrier synchronization operation, restarts the execution of its own process when all the processes, which execute the barrier synchronization operation, arrived the barrier point (called as at the timing that the barrier synchronization is established). Thereby, it is possible to synchronize the parallel processing between the plurality of processes which executes parallel processing.

One of algorithm which realizes the barrier synchronization is a butterfly arithmetic operation. The butterfly arithmetic operation will be simply called a "butterfly" hereinafter. A process is divided into a plurality of stages by the butterfly, and the divided process performs signal communication with other processes at each stage. In the embodiment, the butterfly is used as an algorithm of the barrier synchronization.

FIG. 4 illustrates an example in which barrier synchronization is performed by the butterfly between the four processes #0 to #3. In FIG. 4, for example, the process #0 is expressed by adding number 0 into a circle, and the other processes #1 to #3 are similarly expressed. A destination of a signal indicating that a process arrives at a barrier point on each stage is given by "i XOR (Exclusive-OR) $2^{(k-1)}$" when a stage number is represented by "k" and a process number of its own process or its own node 1 is represented by "i". The number of stages is given by log (N) when the process number N is a power of 2.

For example, focusing on the process #0 in FIG. 4, a destination is determined as described below. On the stage #1, a destination of a signal outputted from the process #0 and indicating that the process arrived at a barrier point is the process #1. On the other hand, on the stage #2, the process #1 receives a signal outputted from the process #0 and indicating that the process arrived at a barrier point, and a destination of a signal outputted from the process #0 and indicating that the process arrived at a barrier point is the process #2.

The destination and the transmission source of these signals can be uniquely determined such that an algorithm of barrier synchronization and execution conditions, that is, a configuration of processes, are determined by setting conditions. In the embodiment, the algorithm of barrier synchronization is a butterfly, and the execution conditions are four processes, so the destination of the signals can be determined as illustrated in FIG. 4.

In the example illustrated in FIG. 4, in the setting conditions which are inputted from the input and output device 4B to the CPU 3, the algorithm of barrier synchronization is a butterfly, and the execution conditions are four processes. In addition, as execution conditions, the number k of the stages subjected to the barrier synchronization, that is, the arithmetic operation, and a process number "i" of each process, that is, its own node, are also inputted. The number k of the stages indicates the maximum number of stage numbers.

The input of the setting conditions to the CPU 3 is not limited to the input described above. For example, any one of the nodes 1 may input the setting conditions to the other nodes 1 through the network 2. A management computer connected to the network 2 may input the setting conditions to all the nodes 1 through the network 2.

Each process communicates a signal indicating that the process arrives at a barrier point with another process on each stage. For example, on the first stage #1 illustrated in FIG. 4, each of the processes arrives at a barrier synchronization point. Timings at which the processes arrive at the barrier synchronization point change depending on the processes. The process arriving at the barrier synchronization point transmits signals to processes set in advance on the next stage on the butterfly network. In the embodiment, the butterfly network indicates the network 2 illustrated in FIG. 1. That is, the butterfly network is the network which performs barrier synchronization by the butterfly and to which the node 1 illustrated in FIG. 2 are connected. This is the same as in the following drawings.

On the next stage #2, the processes are synchronized by a signal from the processes set in advance on the previous stage #1 of the butterfly network. When the processes receive signals from another process, the processes transmit signals to processes set in advance on the next stage 3.

On the final stage #3, the processes are synchronized by a signal from the processes set in advance on the previous stage #2. When the processes receive signals from another process, the system would know that the barrier synchronization is established after all the processes #0 to #3 arrive at a barrier point. Thereafter, each process starts the next operation because the barrier synchronization is established.

(A Configuration of the Reduction Operation Device According to a First Embodiment)

Figure 5:
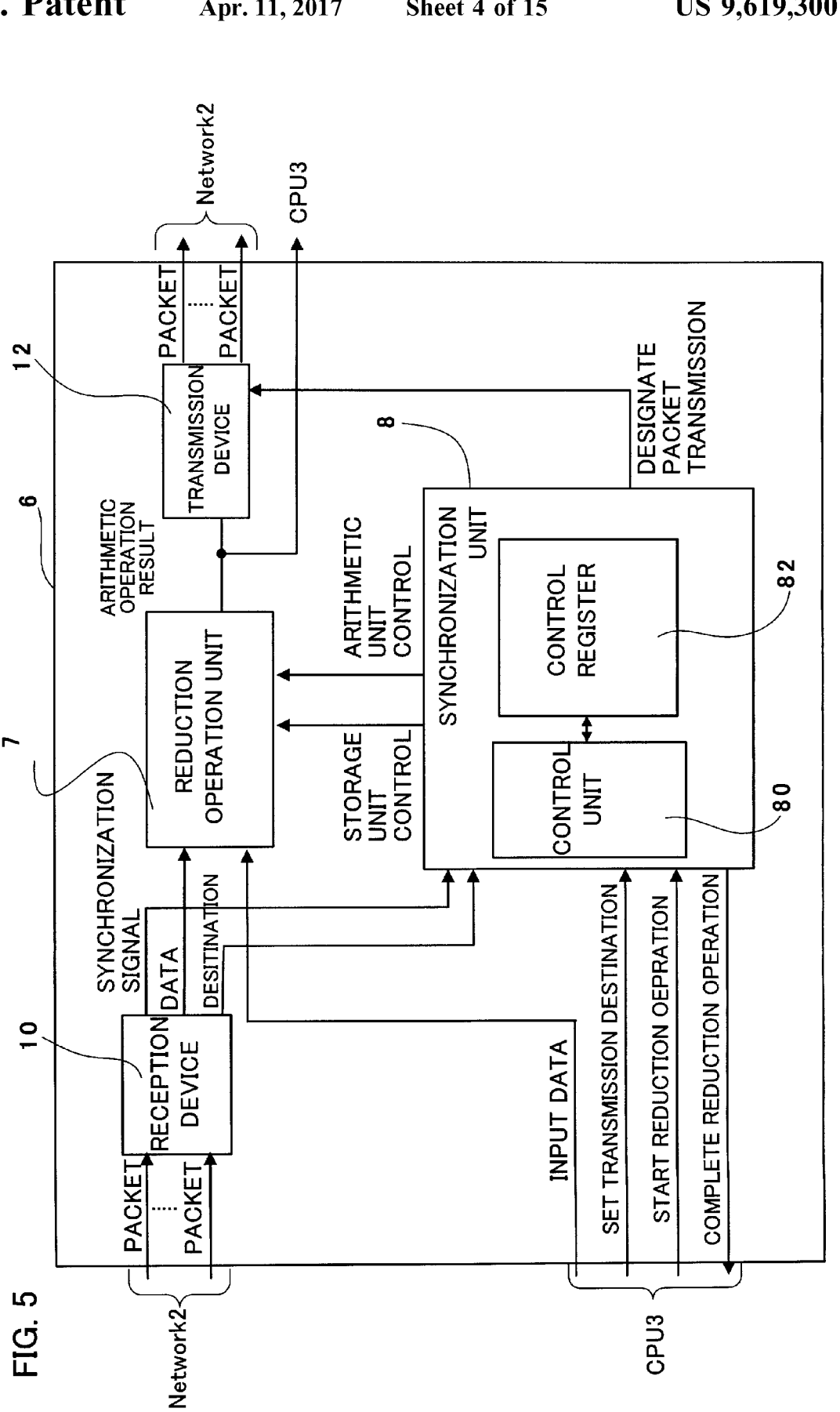
FIG. 5 is a block diagram illustrating a reduction operation device according to an embodiment.
Figure 6:
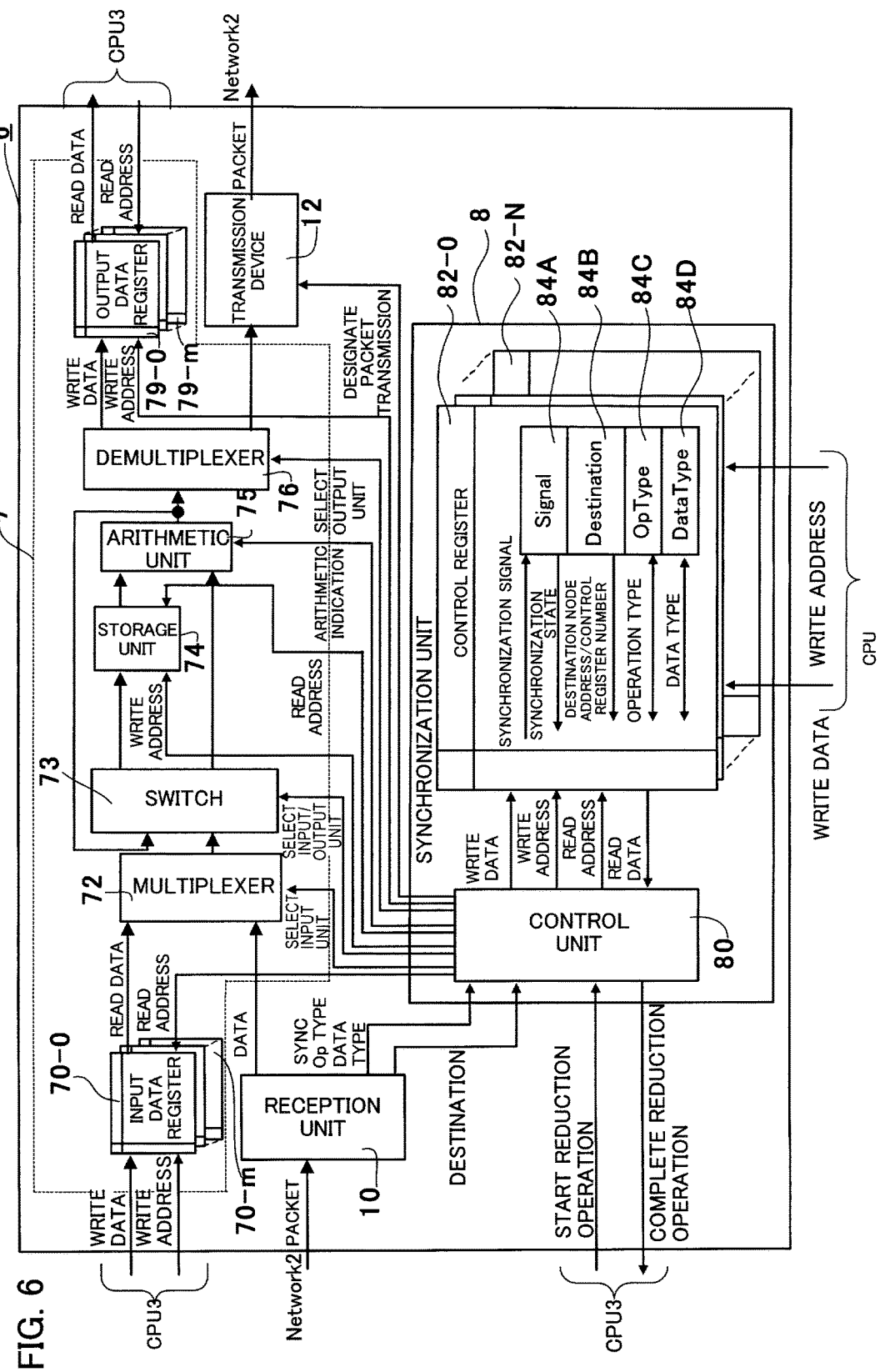
FIG. 6 is a block diagram illustrating a first embodiment of the reduction operation device.
Figure 7:
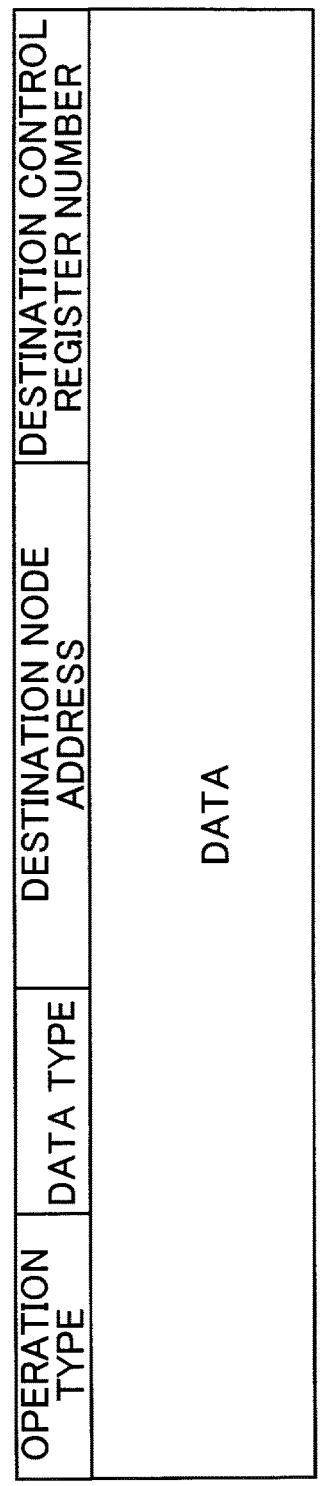
FIG. 7 is a diagram illustrating a format of a packet in the reduction operation device according to FIG. 5 and FIG. 6.

FIG. 5 illustrates a configuration of a reduction operation device according to a first embodiment. FIG. 6 illustrates a detailed block diagram of the reduction operation device in FIG. 5. FIG. 7 illustrates an explanation diagram of a packet format used in FIG. 5 and FIG. 6. The reduction operation device 6 illustrated in FIG. 5 and FIG. 6 is provided to the node 1 which constitutes the computer network illustrated in FIG. 1 and FIG. 2.

The reduction operation device 6 executes a reduction operation while barrier synchronization is performed. As illustrated in FIG. 5, the reduction operation device 6 includes a reduction arithmetic unit 7, a synchronization unit 8, a reception unit 10 and a transmission unit 12. The synchronization unit 8 includes a control unit 80 and a plurality of control registers 82.

The reception unit 10 receives a packet from the network 2, transfers data in the packet to the reduction arithmetic unit 7 and transmits control information (a synchronization signal, operation type, data type and a destination) in the packet to the control unit 80 in the synchronization unit 8. The transmission unit 12 transmits a packet to the network 2 according to a signal indicating a packet transmission from the control unit 80 in the synchronization unit 8.

The control unit 80 in the synchronization unit 8 receives the destination and an indication of a start of a reduction operation from the CPU 3 and receives the control information (a synchronization signal, operation type, data type and a destination) in the packet from the reception unit 10. The control unit 80 in the synchronization unit 8 refers a plurality of control registers 82, judges whether the barrier synchronization is established based on results of the reference and performs a storing control and an operation control of the reduction arithmetic device 7 and a transmission control of the transmission unit 12.

Each of the plurality of control registers 82 in the synchronization unit 8 corresponds to each stage and is used to synchronize, arithmetic and transmit data. That is, it is possible to execute the barrier synchronization by providing a plurality of control registers 82 and holding the synchronization signal in the control register 82 every arithmetic operation. Therefore, when one pair of arithmetic operations is configured by n number of a first synchronization signals, the control unit 80 in the synchronization unit 8 executes barrier synchronization to each of the plurality of pairs each constituted by the n number of the first synchronization signals. In this case, a plurality of processes are operated on one node.

The reduction arithmetic unit 7 receives data of the other node from the reception unit 10 and input data from the CPU 3. The reduction arithmetic unit 7 includes a storage unit and an arithmetic unit as described below. The reduction arithmetic unit 7 stores data on each stage in the storage unit, executes a designated arithmetic operation between stored data by an arithmetic unit and outputs the arithmetic result according to indications of a storing control and an arithmetic control from the synchronization unit 8.

Next, procedures of the reduction arithmetic processing will be explained as below. The CPU 3 of the node 1 in advance sets the control signal and a transmission destination of data to a destination in the control register 82 For example, the CPU 3 designates the transmission destination based on the butterfly algorithm as illustrated in FIG. 4. When starting the reduction operation, the CPU 3 of the node 1 transmits input data and an indication of the reduction operation start to the reduction operation device 6. In the embodiment, the CPU 3 designates the operation type and the data type by the indication of the reduction operation and control signal from a previous stage.

The reduction operation device 6 transmits the control signal and data to a transmission destination designated by the destination in the control register 82 set to the starting point. The reduction operation device 6, which received the control signal and data, updates a synchronization signal (expressed by Signal in FIG. 6) of the control register designated by the transmission destination, and writes the data on the storage unit of the reduction arithmetic unit 7. The synchronization unit 8 refers each control registers 82 and judges whether the synchronization of data is established. When judging that the synchronization is established, the reduction arithmetic unit 7 executes an arithmetic operation designated by the operation type and transmits the arithmetic result and the control signal to the transmission destination designated by the destination.

The control unit 80 of the synchronization unit 8 judges whether the synchronization is established from the synchronization signal in the control register 82. A same processing are continued afterward. And when the synchronization is established by referring the control register 82 set to the end point, the reduction operation device 6 writes the arithmetic result to output data register and notifies a completion of the reduction arithmetic to the CPU 3.

On this configuration, in the embodiment, the CPU 3 designates the operation type and the data type with the indication of the operation start and the arithmetic data to the synchronization unit 8, The control unit 80 in the synchronization unit 8 detects to match or un-match between the operation type and the data type set in a plurality of control registers 82, and notifies the un-match to all nodes when detecting the un-match.

Because of notification to all nodes, it is prevented to become hung-up and to return error arithmetic result even the un-match occurs, thereby the debug operation make easy. Further, in the related art, it is necessary to separately communicate the operation type and the data type from the arithmetic data between the nodes and to execute a comparison process of these types in order to detect the un-match (no-correspondence). Therefore, overhead is occurred. In the embodiment, it is possible to hide the communication time by communicating the operation type and the data type with the reduction arithmetic data. And it is prevented that the detection process causes the overhead because the hardware executes the detection process. Further, it is possible to suppress the cost up because only the comparator for comparing the operation type and the data type is added as addition component of the hardware.

Next, the reduction operation device 6 illustrated in FIG. 5 will be explained in detail according to FIG. 6. As illustrated in FIG. 6, the reduction arithmetic unit 7 includes a plurality of input registers 70-0~70-*m*, a multiplexer 72, a switch 73, a storage unit 74, an arithmetic unit 75, a de-multiplexer 76 and a plurality of output registers 79-0~79-*m*.

Each of a plurality of control registers 82-0~82-N in the synchronization unit 8 corresponds to each set of the synchronization signals. Each of a plurality of control registers 82-0~82-N includes a signal register 84A, a destination register 84B, an operation type register 84C and a data type register 84D. In FIG. 6, the signal register 84A is represented to add the sign "Signal", the destination register 84B is represented to add the sign "Destination", the operation type register 84C is represented to add the sign "Op Type" and the data type register 84D is represented to add the sign "Data Type".

The signal register 84A stores information whether the synchronization signal is received from a process or a node corresponding to the control registers 82-0~82-N. In this manner, the signal register 84A stores information indicating status which wait the synchronization signal. The destination register 84B stores information indicating a process or a node serving as a destination to which the control registers 82-0~82-N transmit the synchronization signal. In this manner, the destination register 84B stores information indicating a transmission destination of the synchronization signal after the synchronization is established.

The destination register 84B stores a destination node address serving as a transmission destination and a control register number when the destination of the synchronization signal indicates the other node. The destination node address is a network address of the node and is uniquely determined. The control register number is a number allocated to the control registers 82-0~82-N and is uniquely determined in the node. The destination node address may be a node number added to a node in advance. The control register number may be a number or a pair number added to the control registers 82-0~82-N in advance.

One control register in one node is determined by designating the destination node address and the control register number. When the transmission destination of the synchronization signal is a node which transmits the synchronization signal, the destination register 84*b* stores a control register number of the synchronization unit 8 of the process itself or the node itself.

The type register 84C stores an operation type in the reduction arithmetic operation. For example, the operation type is a summation (SUM), maximum value arithmetic (MAX) and minimum value arithmetic (MIN). The data type register 84D stores a data type of the reduction operation. The data type indicates which of an integer data or a floating point data, which of a double precision or a single precision and the number of byte, for example.

The reception unit 10 is connected to the other node through the network 2 and receives a packet including a synchronization signal from the other node. As illustrated in FIG. 7, the packet includes a format of an operation type, data type, a destination (a transmission destination address and a transmission destination control register number) and data. When the reception unit 10 receives a packet from the reduction operation device 6 of the other node through the network 2, the reception unit 10 picks up the synchronization signal, the operation type, the data type, the data and the destination from the received packet and transmits the synchronization signal, the operation type, the data type and the destination to the control unit 80 in the synchronization unit 8.

The destination indicates a destination node address and a control register number of the control register which indicate a destination of the synchronization signal. The destination determines the node corresponding to the picked up destination node address and the control register 80-0~80-N corresponding to the picked up control register number. And the reception unit 10 outputs the data in the packet to the multiplexer 72.

Next, the reduction arithmetic unit 7 will be explained. A first target data of the reduction arithmetic operation is inputted to the input data registers 70-0~70-*m* as write data from the CPU 3. The read data (write data) is read from the input data register 70-0~70-*m* corresponding to read address from the control unit 80 and is inputted to the multiplexer 72. A second target data of the reduction arithmetic operation is picked up from the packet which is received by the reception unit 10 through the network 2 and is inputted to the multiplexer 72.

While, a result of the reduction arithmetic operation is output to the output data registers 79-0~79-*m* from the de-multiplexer 846 as write data, and is output to the CPU 3 from the output data registers 79-0~79-*m* as read data. And the result of the reduction arithmetic operation is output to the transmission unit 12 from the de-multiplexer 846, and is transmitted to the network 2 from the transmission unit 12 as packet.

A plurality of input data registers 70-0~70-*m* and a plurality of output data registers 79-0~79-*m* are provided. Each of the input data registers 70-0~70-*m* corresponds to the control registers 82-0~82-N. And each of the output data registers 79-0~79-*m* corresponds to the control registers 82-0~82-N.

The write address from the CPU 3 designates the input data registers 70-0~70-*m* which writes the write data. The read address from the control unit 80 designates the input data registers 70-0~70-*m* which reads the read data. The read address of the input data registers 70-0~70-*m* corresponds to the control registers 82-0~82-N designated by the destination in the packet received by the reception unit 10, for example. The read address is created based on the control register number of the control registers 82-0~82-N.

The write address from the control unit 80 designates the output data registers 79-0~79-*m* which writes the write data. The write address of the output data registers 79-0~79-*m* corresponds to the control registers 82-0~82-N which is used by the reduction arithmetic operation of the write data. The write address is created based on the control register number of the control registers 82-0~82-N. The read address from the CPU 3 designates the output data registers 79-0~79-*m* which reads the read data.

The multiplexer 72 selects one of data from the input data registers 70-0~70-*m* and data from the reception unit 10 according to an indication of input selection from the control unit 80. The selected data is inputted to the storage unit 74 or the arithmetic unit 75 through the switch 73. The control unit 80 instructs the input selection to the multiplexer 842 to select the data from the reception unit 10 in the case that the synchronization signal and the destination are inputted from the reception unit 10 and to select the read data from the input data registers 70-0~70-*m* in the case except above case.

The switch 73 inputs the input from the multiplexer 72 or the arithmetic unit 75 to the storage unit 74 or the arithmetic unit 75 according to an instruction of input/output selection from the control unit 80. The control unit 80 controls the switch 73 to select data from the multiplexer 842 in the case that data is inputted from the multiplexer 72 and to select data from the arithmetic unit 75 in the case except above case. And the control unit 80 controls the switch 73 to output the input data to the arithmetic unit 845 in the case that the synchronization is established and to output the input data to the storage unit 844 in the case except above case.

The storage unit 74 stores data which is inputted through the multiplexer 72 and the switch 73. In this manner, the storage unit 74 stores data during the reduction arithmetic operation. For example, the storage capacity of the storage unit 74 is (the number of the control registers 82-0~82-N)*(a number of bit of data). The storage unit 74 stores data during the reduction arithmetic operation in an address designated by the write address from the control unit 80. The write address of the storage unit 74 corresponds to the control registers 82-0~82-N which are used for the reduction arithmetic operation. The control unit 80 creates the write address based on the control register number of the control registers 82-0~82-N.

The control unit 80 reads the data during the reduction arithmetic operation stored in the storage unit 74 to the arithmetic unit 75 according to the read address. The read address to the storage unit 74 corresponds to the control registers 82-0~82-N which are used for the reduction arithmetic operation. The control unit 80 creates the read address based on the control register number of the control registers 82-0~82-N.

The arithmetic unit 75 executes an arithmetic operation instructed from the control unit 80 between waiting data in the storage unit 74 and the data from the packet inputted through the multiplexer 72 or a previous result of the arithmetic operation when the synchronization is established. That is, the arithmetic unit 75 executes a designated arithmetic operation according to an arithmetic instruction from the control unit 80 and outputs the result of the arithmetic operation to the de-multiplexer 76 and the switch 73.

The arithmetic unit 75 includes an adder (ADD), a logical circuit (Logical), a maximum value calculator (MAX) and a minimum value calculator (MIN), for example.

The arithmetic unit 75 executes an instructed arithmetic operation between data (a first data) inputted from the storage unit 74, data inputted from the input data registers 70-0~70-*m* and the data from the packet received by the reception unit 10 or a result (a second data) of the arithmetic operation that the arithmetic unit 75 executed at a previous stage. The control unit 80 creates the arithmetic instruction based on the value in the type register 84C which indicates a type of the operation.

The de-multiplexer 76 outputs the input from the arithmetic unit 75 to the output data registers 79-0~79-*m* or the transmission unit 12 according to an instruction of output selection from the control unit 80. The control unit 80 controls the de-multiplexer 76 to output data from the arithmetic unit 75 to the transmission unit 12 before the reduction arithmetic operation is completed, and to output the data from the arithmetic unit 75 to the output data registers 79-0~79-*m* when the reduction arithmetic operation is completed.

And the control unit 80 instructs the transmission of a second synchronization signal to the transmission unit 12 after the synchronization is established. In FIG. 6, the instruction is represented by the "packet transmission instruction". And the control unit 80 instructs a predetermined reduction arithmetic operation to the reduction arithmetic unit 84. The transmission unit 12 transmits the result of the reduction arithmetic operation in the arithmetic unit 75 with a second synchronization signal to the network 2 when receiving the transmission instruction of the second synchronization signal.

(A First Embodiment of the Reduction Arithmetic Operation)

Figure 8:
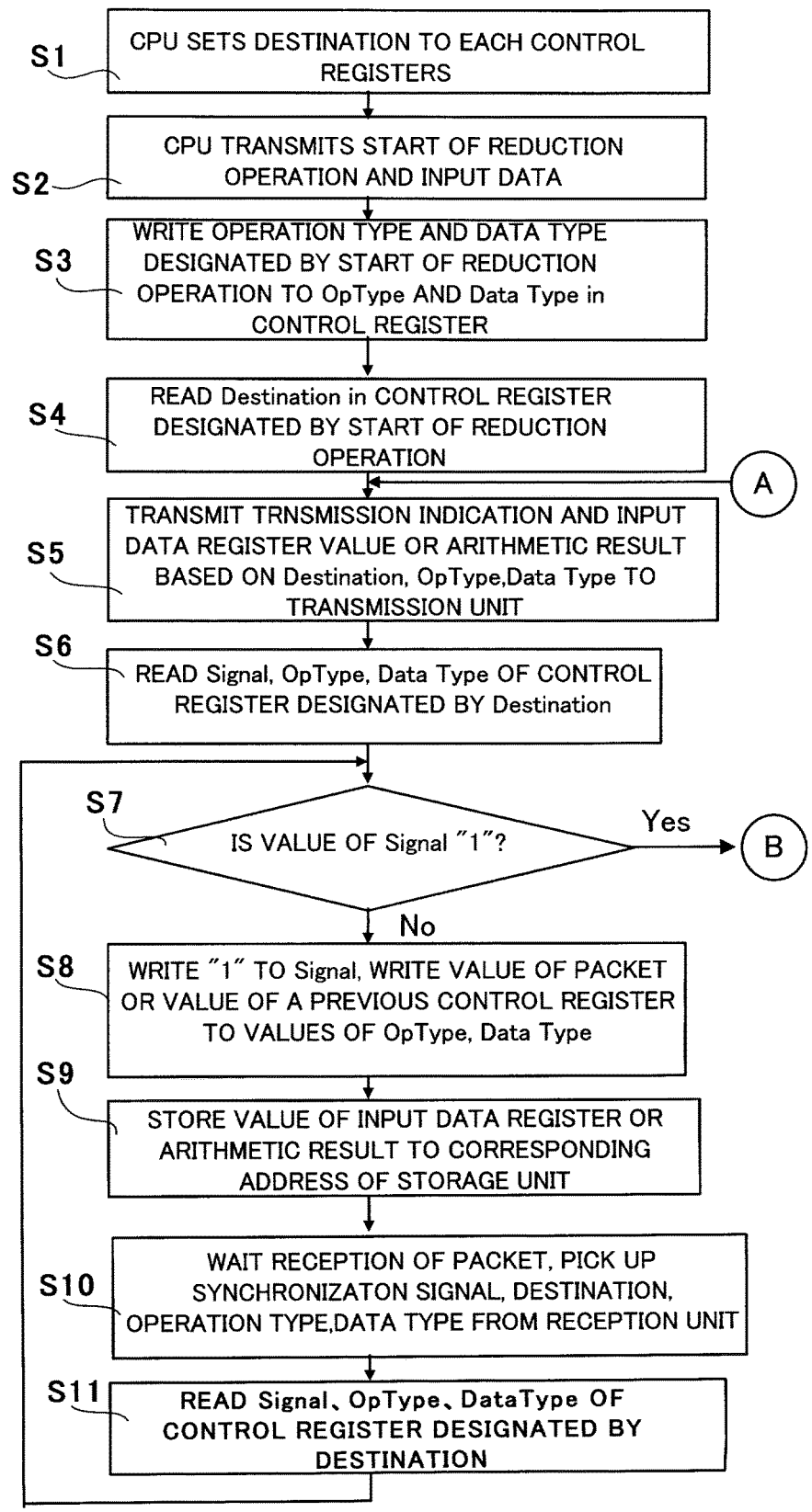
FIG. 8 is a diagram illustrating a first flow chart of the reduction operation process according to FIG. 6.
Figure 9:
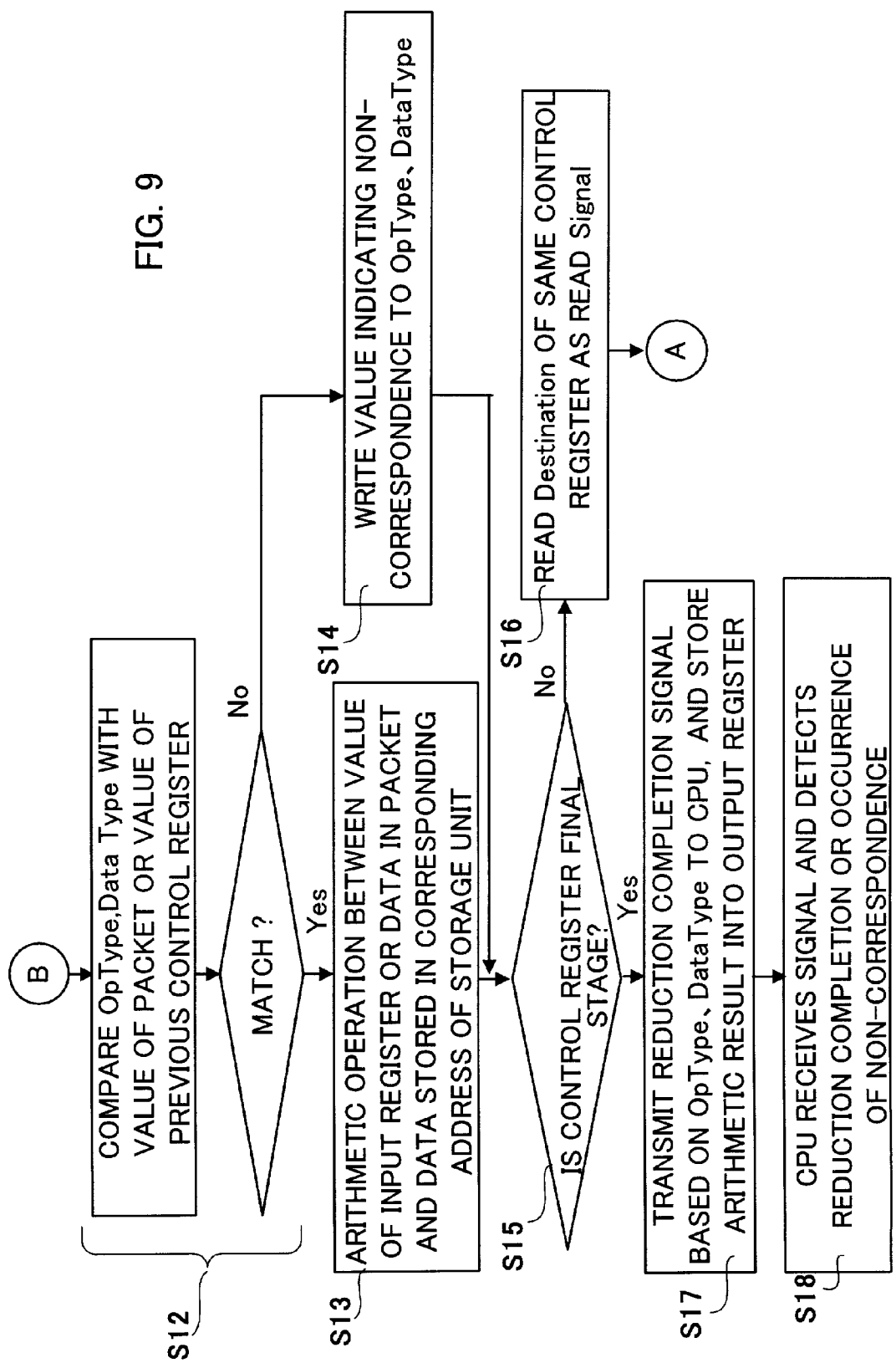
FIG. 9 is a diagram illustrating a second flow chart of the reduction operation process according to FIG. 6.

FIG. 8 and FIG. 9 illustrate diagrams of processing flow of the reduction arithmetic operation according to the embodiment.

(S1) Before executing the reduction arithmetic operation, the CPU 3 writes the transmission destination to the destination register 84B (represented by sign "Destination" in FIG. 6) in each control registers 82-0~82-N in the synchronization unit 8 of the reduction operation device. That is, the CPU 3 sets the node address and the control register number corresponding to next stage which is determined by the algorithm of the reduction arithmetic operation such as the butterfly to the destination register 84B. As the node address, only the other node or the only its own node is written.

(S2) The CPU 3 transmits an input data to the input data registers 70-0~70-*m* and a signal indicating a start of the reduction arithmetic operation to the synchronization unit 8 in order to start the reduction arithmetic operation. The signal indicating a start of the reduction arithmetic operation include the input register number, the control register number corresponding to a first stage, the operation type and the data type.

(S3) The control unit 80 of the synchronization unit 8 writes the operation type, the data type to the operation type register 84C and the data type register 84D in the control register of the control register number designated by the signal indicating a start of the reduction arithmetic operation when receiving the signal indicating a start of the reduction arithmetic operation. In FIG. 6, the operation type register 84C is represented to add the sign "Op Type" and the data type register 84D is represented to add the sign "Data Type".

(S4) The control unit 80 of the synchronization unit 8 reads the value in the destination register (Destination) 84B in the control registers 82-0~82-N designated by the signal indicating a start of the reduction arithmetic operation after writing to the control register.

(S5) The control unit 80 judges whether the value of destination register 84B designates its own node or the other node. The control unit 80 transmits the data and a signal indicating the transmission of the packet to the transmission unit 12 when the value of the destination register 84B designates the other node. The data which is transmitted to the transmission unit 12 is a value stored in the input data register 70-0 when a first stage is designated to the designated control register. And the data which is transmitted to the transmission unit 12 is a result of the arithmetic from the arithmetic unit 75 when a succeeding stage is designated to the designated control register. The control unit 80 instructs a bypass as the arithmetic instruction to the arithmetic unit 75 when the value in the input data register 70-0 is transmitted to the transmission unit 12. As illustrated in FIG. 7, the signal indicating the transmission of the packet from the control unit 80 includes the node address which is a transmission destination, a transmission destination control register number, an operation type and data type. The transmission unit 12 creates the packet based on the data and above the signal indicating the transmission as illustrated in FIG. 7 and transmits the packet to the network 2.

(S6) When the control unit 80 judged that the value of destination register 84B has designated its own node, the control unit 80 reads the value in the signal register 84A of the control register that is designated by the destination register 84B to transmit the synchronous signal to its own synchronization unit 8. And the control unit 80 reads the values in the operation type register 84C and the data type register 84D to detect a non-correspondence.

(S7) The control unit 80 judges whether the synchronization is established from the value of signal register 84A. The control unit 80 judges that the synchronization is established when the value "1" is set to the signal register 84A. While, the control unit 80 judges that the synchronization is not established when the value "1" is not set to the signal register 84A.

(S8) When the control unit 80 judged that the synchronization was not established, the control unit 80 writes the value "1" to the signal register 84A and writes the operation type and the data type to the operation type register 84C and the data type register 84D respectively. The values of the operation type and the data type are the value in the packet or the value of the control register at a previous time. That is, when the steps 16, S5 and S6 are executed just immediately, the values that are written are the value in step S16 or the values of the operation type and the data type that are read from the control register in step S5. In contrary, when the processes in steps S10 and S11 are execute just immediately, the values that are written are the value in the packet that is received in step S10.

(S9) The control unit 80 stores the data into the address position corresponding control register of the data storage unit 74. When the control register 82-0 indicates a first stage, the value in the input register 70-0 is stored as data, and when the control register indicates a succeeding stage, an arithmetic result at a previous stage is stored.

(S10) The control unit 80 waits a reception of the packet. When the reception unit 10 receives the packet from the network 2, the reception unit 10 picks up data, the synchronization signal, the destination, the operation type and the data type from the received packet and transmits them to the multiplexer 72 and the synchronization unit 8.

(S11) When the control unit 80 receives the signals from the reception unit 10, the control unit 80 reads the signal in the signal register 84A, the operation type in the operation type register 84C and the data type in the data type register 84D of the control register designated by the destination. And the control unit 80 returns the processing in step S7 and repeats the processing from step S7 to step S11 until the synchronization is established.

(S12) When the control unit 80 judges that the synchronization is established in the judgment of step S7, the control unit 80 detects non-correspondence of the operation type and the data type. The detection of the non-correspondence is executed by comparing the operation type in the operation type register 84C and the data type in the data type register 84D of the control registers 82-0~82-*m* with the operation type and the data type. The values of the operation type and the data type are the value of the operation type and the data type read from the control register in step S16 or step S5, when the steps 16, S5 and S6 are executed just immediately. In contrary, when the processes in steps S10 and S11 are execute just immediately, the values of the operation type and the data type are the value in the packet that is received in step S10. The control unit 80 judges that the non-correspondence occurs when detecting un-match of the values or detecting the non-corresponding value among the compared values by the comparison. While, the control unit 80 judges that non-correspondence does not occur when detecting the match of the values by the comparison.

(S13) When judging that non-correspondence does not occur, the arithmetic operation is executed. The target data of the arithmetic operation is one of (1) the value in the input data register 70-1 when the control register corresponds to just next stage after the first stage, (2) the data in the packet when the control register corresponds to the later stage and a factor of the establishment of the synchronization is a synchronization signal from the packet, and (3) the arithmetic result at a previous stage when the factor of the establishment of the synchronization is a synchronization signal from the synchronization unit of its own. The arithmetic unit 75 executes the arithmetic operation between any one data of above (1), (2) and (3) and the data in an address, which corresponds to the control register that the synchronization is established, of the storage unit 74.

(S14) In contrary, when judging that non-correspondence occurs, the control unit 80 writes the value indicating the non-correspondence to the arithmetic operation register 84C and the data type register 84D in the control registers 82-0~82-*m*.

(S15) The control unit 80 judges whether the control register that the synchronization is established corresponds to a final stage.

(S16) When the control unit 80 judges that the control register that the synchronization is established does not correspond to the final stage, the control unit 80 reads the value in the destination register 84B of the control register that includes the signal register 84A of which is read in step S7. The control unit 80 returns to the step S5 in FIG. 8.

(S17) When the control unit 80 judges that the control register that the synchronization is established corresponds to the final stage, the control unit 80 sends a signal indicating the completion of the reduction operation based on the values of the operation type register 84C and the data type register 84D to the CPU 3. And the control unit 80 stores the arithmetic result of the arithmetic unit 75 into the output data registers 79-0~79-*m*. The signal indicating the completion of the reduction operation has information whether there is non-correspondence, because the signal indicating the completion of the reduction operation is created based on the value of the operation type register 84C and the data type register 84D. In this manner, when the values of the operation type register 84C and the data type register 84D indicate the non-correspondence, the control unit 80 notifies the non-correspondence with the signal indicating the completion of the reduction operation to the CPU 3.

(S18) The CPU 3 receives the signal indicating the completion of the reduction operation and detects the completion of the reduction operation or the occurrence of the non-correspondence.

As above described, it is possible to judge the non-correspondence before the arithmetic operation at the establishment of the synchronization, because the control unit 80 judges the correspondence of the operation type and the data type of the plurality of arithmetic data (that is, control registers) at the timing of the establishment of the synchronization. Therefore, it is prevented to cause the hang-up and error arithmetic processing. In this embodiment, both correspondences of the operation type and the data type are detected, but any one of correspondences of the operation type and the data type may be detected.

Figure 10:
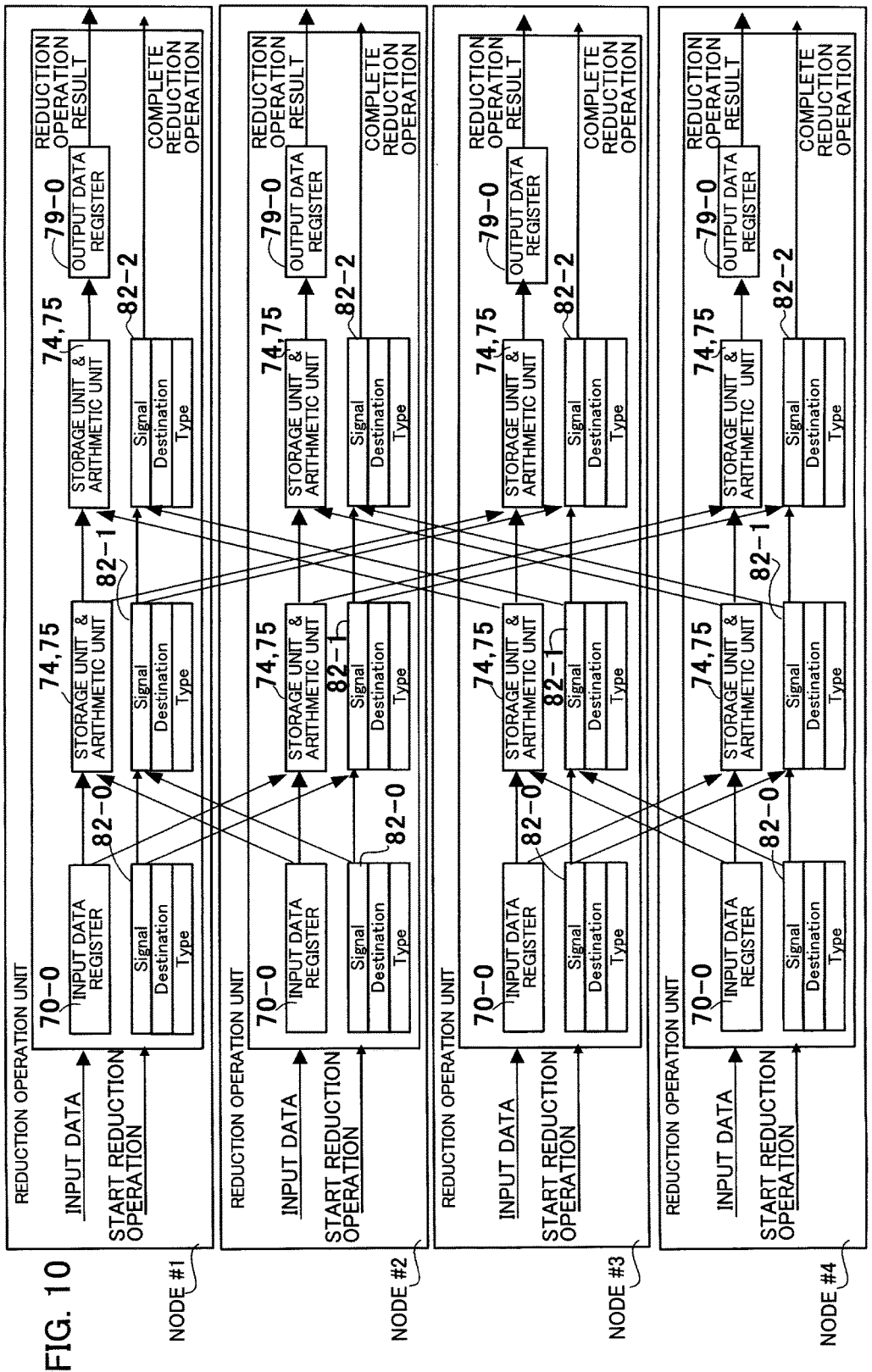
FIG. 10 is a diagram illustrating the reduction operation process according to FIG. 1 to FIG. 6.

FIG. 10 illustrates a flow of the synchronization signal between each stage in the reduction operation process according to the butterfly of the reduction operation device in FIG. 5 to FIG. 10. In FIG. 10, same elements as illustrated in FIG. 8 and FIG. 9 indicate same symbols in FIG. 8 and FIG. 9. It will be explained by an example that four nodes #1~#4 execute the reduction operation by the butterfly, as illustrated in FIG. 1.

In FIG. 10, each control registers 82-0~82-2 correspond to each stage and is used to synchronize, arithmetic and transmit the data. The storage unit 74 stores the data of each stage. The arithmetic unit 75 executes the arithmetic operation between the stored data. The input register 70-0 stores the input data of the reduction operation and the output register 79-0 stores the arithmetic result of the reduction operation.

The flow of the reduction operation processing will be described as below. The CPUs 3 of each node #1~#4 designate the control signal and the destination of the data to the destination (expressed "Destination" in FIG. 10) in the control register 82-0. In FIG. 10, the destination is designated by the algorithm of the butterfly. When starting the reduction operation, the CPUs 3 of each node #1~#4 transmit the input data and the indication signal of the start of the reduction operation including the operation type and the data type to the reduction operation device 6.

The reduction operation device 6 transmits the control signal and the data to the transmission destination designated by the destination (Destination) in a starting control register (that is, the control register 82-0). The reduction operation device, which receives the control signal and the data, updates the signal (expressed "Signal" in FIG. 10) of the control register 82-1 designated by the transmission destination and writes the data to the storage unit 74.

When the synchronization of the data is established on each control register, the arithmetic unit 75 executes the arithmetic operation designated by the operation type and transmits the arithmetic result and the control signal to the transmission destination designated by the destination (illustrated as Destination). The signal (illustrated as Signal) of the control register is used to judge the synchronization. Same processing are continued later. When the synchronization is established on an end control register (that is, the control register 82-2), the arithmetic result is written to the output data register 79-0 and the completion of the reduction operation is notified to the CPU 3 of the node.

In FIG. 10, focusing on the node #1, the synchronization signal and the arithmetic target data are run as below. For example, when the node #1 receives the input data which is data of the arithmetic target, the node #1 is instructed the start of the reduction operation by inputting the signal indicating the start of the reduction operation. The node #1 transmits the synchronization signal and the arithmetic target data to the node #1 and the node #2 which are destinations designated in advance at the stage #1, in response to the instruction.

In the stage #2, the node #1, which received its own synchronization signal and the arithmetic target data, waits the synchronization signal from the node #2 designated in advance and holds the received arithmetic target data in the storage unit 74 and the arithmetic unit 75. The synchronization signal and the arithmetic target data of the stage #2 arrive from the node #2 to the node #1, after the node #2 received the input data, as same as the node #1.

When the node #1 received the synchronization signal from the node #2, an appointment is established between the synchronization signal from the node #2 and the synchronization signal of the node #1 on the node #1. That is, the synchronization of two signals is established on the node #1. When the synchronization is established on the node #1, in the stage #2, the node #1 executes the arithmetic operation between its own arithmetic target data and the arithmetic target data from the node #2 and transmits the synchronization signal and the arithmetic result to the node #1 and the node #3 which are designated destination in advance. The arithmetic result is used as the arithmetic target data of the node #1 and node #3.

In the stage #3, the node #1, which received its own synchronization signal and the arithmetic target data, waits the synchronization signal from the node #3 designated in advance and holds the received arithmetic target data in the storage unit 74 and the arithmetic unit 75. The synchronization signal and the arithmetic target data of the stage #3 arrive from the node #3 to the node #1, after the node #3 receives the input data and the synchronization signal from the node #4 which received the input data, as same as the node #1.

When the node #1 received the synchronization signal from the node #3, the synchronization is established between the synchronization signal from the node #3 and the synchronization signal of the node #1 on the node #1. When the synchronization is established on the node #1, in the stage #3, the node #1 executes the arithmetic operation between its own arithmetic target data and the arithmetic target data from the node #3 and outputs the arithmetic result to the output data register 79-0 which is designated in advance.

Thereafter, the reduction operation device 6 of the node #1 outputs the signal indicating the completion of the reduction operation to the CPU 3 and outputs the data which is held in the output data register 79-0 to the CPU 3 as the result of the reduction arithmetic operation.

On the nodes #2~#4, in the stage #3, the synchronization is established on the nodes #2~#4, and the reduction operation device 6 of the nodes #2~#4 output the signal indicating the completion of the reduction operation and the result of the reduction arithmetic operation to the CPU 3, as same as the node #1. In this manner, the reduction operation is performed by the butterfly.

Figure 11:
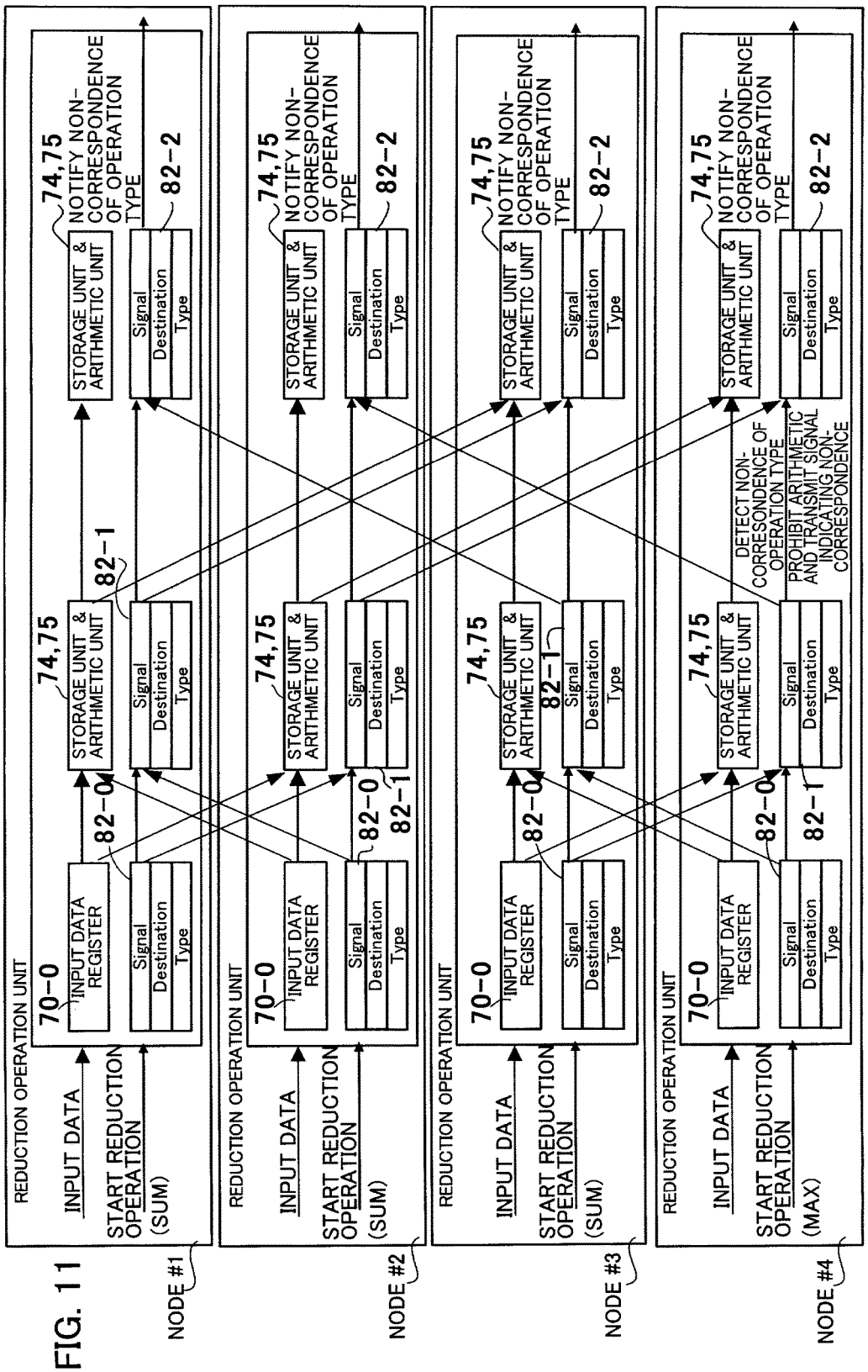
FIG. 11 is a diagram illustrating a detection process of non-correspondence in the reduction operation according to FIG. 6 to FIG. 9.

FIG. 11 is a diagram illustrating a detection process of non-correspondence in the reduction operation by the butterfly in FIG. 10. In FIG. 11, same elements as illustrated in FIG. 10 indicate same symbols in FIG. 10. It will be explained by an example that four nodes #1~#4 execute the reduction operation by the butterfly, as illustrated in FIG. 1.

The CPUs 3 of each node #1~#4 transmit the input data and the indication signal of the start of the reduction operation including the operation type and the data type to the reduction operation device 6. In an example illustrated in FIG. 11, the nodes #1~#3 designate the summation arithmetic (SUM) as the operation type, and the node #4 designates a calculation of maximum value (MAX), thereby the non-correspondence occurs.

The reduction operation device 6, which received the input data and the indication signal of the start of the reduction operation, transmits the input data and the control signal to the transmission destination designated by the destination (illustrated as Destination in FIG. 11). The control signal includes the operation type and the data type designated from the node. When the reduction operation device 6 receives the control signal and the data, the reduction operation device 6 updates the signal (expressed "Signal" in FIG. 10) of the control register 82-1 and writes the data to the storage unit 74.

When establishing the synchronization, the control unit 80 of the reduction operation device 6 firstly checks the operation type. When the control unit 80 judged that both the operation type are not equal or the control signal indicating the non-correspondence is received by the check, the control unit 80 does not execute the arithmetic operation and transmits the control signal indicating the non-correspondence. When the control register 82-2 is designated an end point, the control unit 80 notifies the non-correspondence of the operation type to the CPU 3.

In FIG. 11, the non-correspondence occurs because the operation type of the control register 82-1 of the node #3 indicates the calculation of maximum value (MAX), while the operation type of the control register 82-1 of the node #4 indicates the summation (SUM). And the control unit 80 in the node #3 and the node #4 transmit the signal indicating the non-correspondence.

The control signal indicating the non-correspondence is transmitted to the control register 82-2 of the all nodes, thereby the non-correspondence is notified. Because the control registers 82-2 of the end point are incorporated to tree structured network for the control register of the start point in all nodes, it is possible to invariably detect the non-correspondence by any control register.

The data type is checked using the control register as same as the operation type. When both the data type are not equal or the control signal indicating the non-correspondence is received, the control unit 80 transmits the control signal indicating the non-correspondence.

In this manner, it is possible to prevent the reduction operation having the non-correspondence because the reduction operation device detects the non-correspondence of the operation type and the data type between the nodes at the timing of the establishment of the synchronization. Therefore, it is prevented to cause the hang-up because of incompletion of the processing or to arithmetic error arithmetic result.

Because the reduction operation device detects the non-correspondence, it is possible to save to communicate the operation type and the data type separately from the reduction arithmetic data between the nodes to detect the non-correspondence.

(A Second Embodiment of Construction of the Reduction Operation Device)

Figure 12:
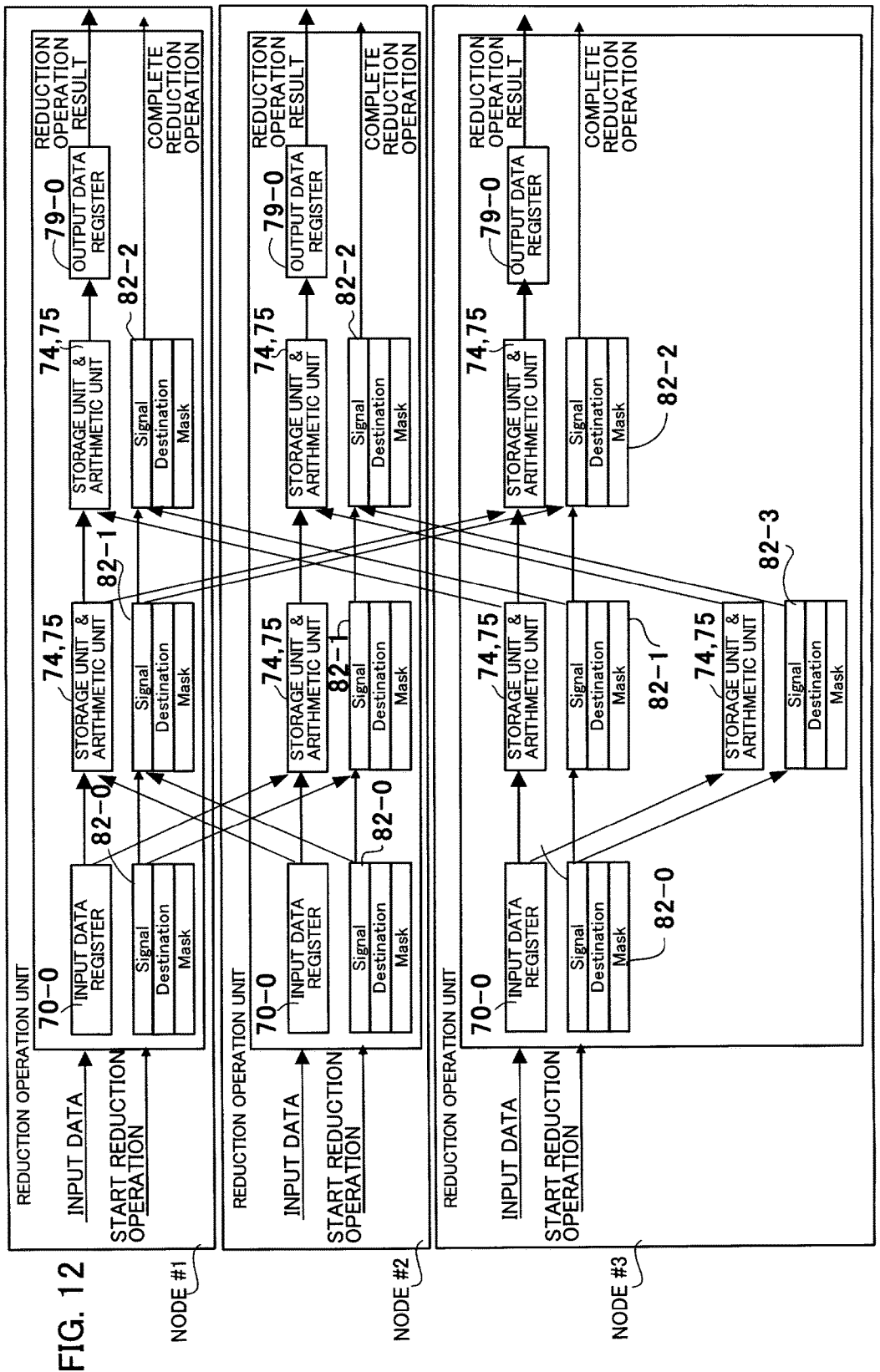
FIG. 12 is a block diagram illustrating a second embodiment of the reduction operation process according to FIG. 5.

FIG. 12 illustrates a diagram of processing of the reduction operation according to the second embodiment. In FIG. 12, same elements as the elements explained in FIG. 5 to FIG. 11 are expressed by same symbol. FIG. 12 illustrates an example that three nodes #1, #2 and #3 execute the reduction operation explained in FIG. 10.

In the butterfly algorithm, if the number of nodes is not a power of 2, the control register, of which the additional node added when rounding toward the power of 2 has, is provided to any one of the nodes. In FIG. 12, the node #3 is provided the control register 82-3 of the node #4. Because the control register 82-3 are not input the control signal from the node #4, the value in the signal register 84A of the control register 82-3 is set the value of the status that one control signal is already received. Thereby, the synchronization is established at the timing that the synchronization signal from the node #3 is input to the control register 82-3. Because the reduction operation does not use the control register 82-3 for arithmetic, a mask register as later mentioned makes effective.

By above construction, same reduction operation processing are performed as explained in FIG. 10, even though three nodes #1, #2 and #3 are used.

Figure 13:
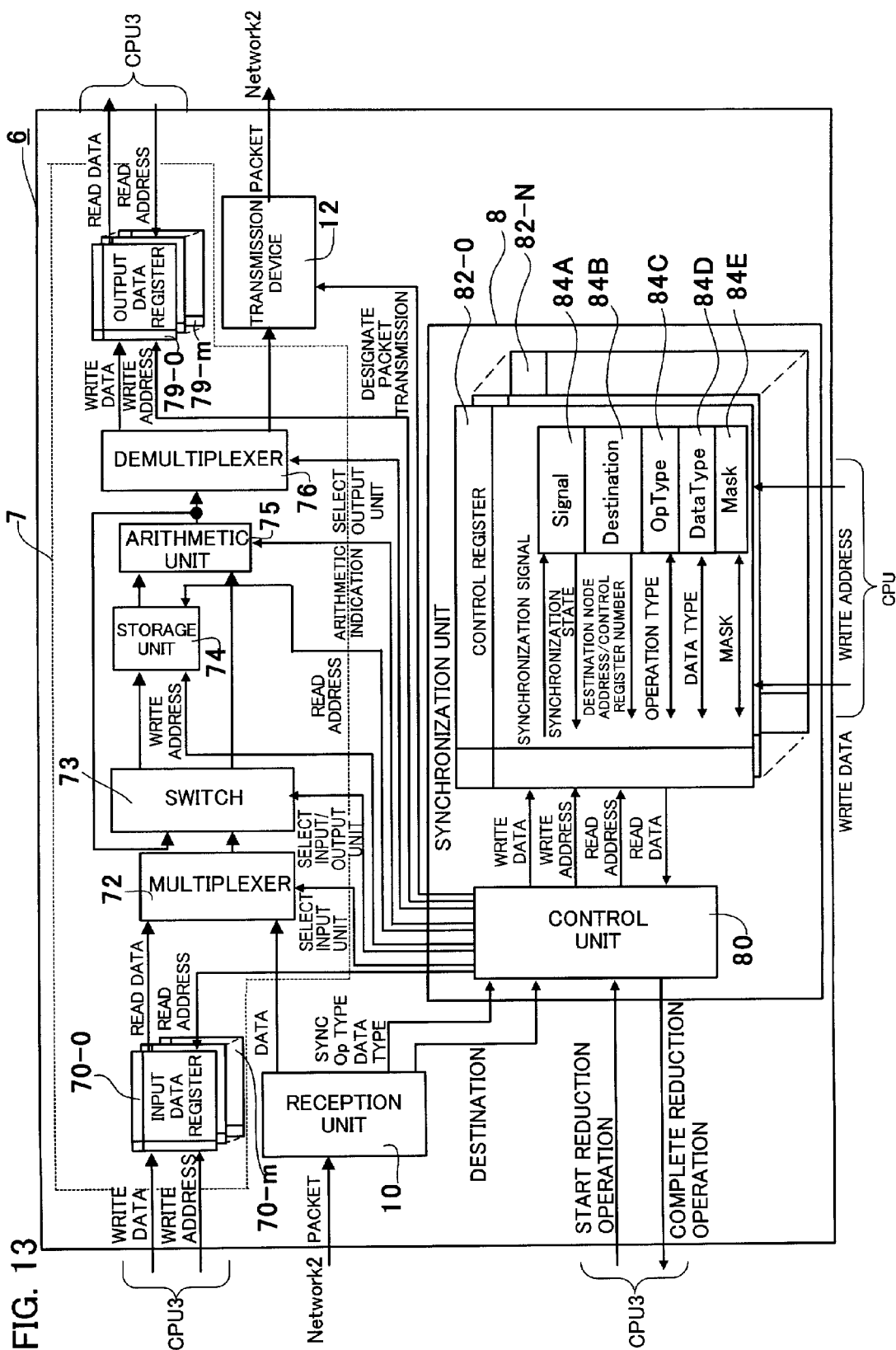
FIG. 13 is a block diagram illustrating a reduction operation device according to FIG. 12.

FIG. 13 illustrates a block diagram of the reduction operation device according to the second embodiment of FIG. 12. In FIG. 13, same elements as the elements explained in FIG. 6 are expressed by same symbol. As illustrated in FIG. 13, the reduction operation device 6 includes a reception unit 10, a synchronization unit 8, a reduction arithmetic unit 7 and a transmission unit 12. The synchronization unit 8 includes a control unit 80 and a plurality of control registers 82.

The reduction arithmetic unit 7 includes a plurality of input registers 70-0~70-*m*, a multiplexer 72, a switch 73, a storage unit 74, an arithmetic unit 75, a de-multiplexer 76 and a plurality of output registers 79-0~79-*m*.

Each of a plurality of control registers 82-0~82-N in the synchronization unit 8 corresponds to each set of the synchronization signals. Each of a plurality of control registers 82-0~82-N includes a signal register 84A, a destination register 84B, an operation type register 84C, a data type register 84D and a mask register 84E. In FIG. 13, the signal register 84A is represented to add the sign "Signal", the destination register 84B is represented to add the sign "Destination", the operation type register 84C is represented to add the sign "Op Type", the data type register 84D is represented to add the sign "Data Type" and the mask register 84E is represented to add the sign "Mask".

The signal register 84A stores information whether the synchronization signal is received from a process or a node corresponding to the control registers 82-0~82-N. The destination register 84B stores information indicating a process or a node serving as a destination to which the control registers 82-0~82-N transmit the synchronization signal. In this manner, the destination register 84B stores information indicating a transmission destination of the synchronization signal after the synchronization is established.

The destination register 84B stores a destination node address serving as a transmission destination and a control register number when the destination of the synchronization signal indicates the other node. The type register 84C stores an operation type in the reduction arithmetic operation. For example, the operation type is the summation (SUM), the maximum value arithmetic (MAX) and the minimum value arithmetic (MIN). The data type register 84D stores a data type of the reduction operation. The data type indicates which of an integer data or a floating point data, which of a double precision or a single precision and the number of byte, for example.

In the second embodiment, the mask register 84E is added to the control registers 82-0~82-N. The control unit 80 does not detect the non-correspondence and does not execute arithmetic operation when the mask register 84E indicates an effective even though the synchronization is established. In this manner, the mask register 84E is effective for the control register of which is added when rounding toward the power of 2, such as the control register 82-4 of the node #3 explained in FIG. 12.

The reception unit 10 is connected to the other node through the network 2 and receives a packet including a synchronization signal from the other node. When the reception unit 10 receives the packet as explained in FIG. 7 from the reduction operation device 6 of the other node through the network 2, the reception unit 10 picks up the synchronization signal, the operation type, the data type, the data and the destination from the received packet and transmits the synchronization signal, the operation type, the data type and the destination to the control unit 80 in the synchronization unit 8.

The destination indicates a destination node address and a control register number of the control register which indicate a destination of the synchronization signal. The destination determines the node corresponding to the picked up destination node address and the control register 80-0~80-N corresponding to the picked up control register number. And the reception unit 10 outputs the data in the packet to the multiplexer 72.

A first target data of the reduction arithmetic operation is inputted to the input data registers 70-0~70-*m* as write data from the CPU 3. The read data (write data) is read from the input data register 70-0~70-*m* corresponding to read address from the control unit 80 and is inputted to the multiplexer 72. A second target data of the reduction arithmetic operation is picked up from the packet which is received by the reception unit 10 through the network 2 and is inputted to the multiplexer 72.

While, a result of the reduction arithmetic operation is output to the output data registers 79-0~79-*m* from the de-multiplexer 846 as write data, and is output to the CPU 3 from the output data registers 79-0~79-*m* as read data. And the result of the reduction arithmetic operation is output to the transmission unit 12 from the de-multiplexer 846, and is transmitted to the network 2 from the transmission unit 12 as packet.

A plurality of input data registers 70-0~70-*m* and a plurality of output data registers 79-0~79-*m* are provided. Each of the input data registers 70-0~70-*m* corresponds to the control registers 82-0~82-N. And each of the output data registers 79-0~79-*m* corresponds to the control registers 82-0~82-N.

The write address from the CPU 3 designates the input data registers 70-0~70-*m* which writes the write data. The read address from the control unit 80 designates the input data registers 70-0~70-*m* which reads the read data. The read address of the input data registers 70-0~70-*m* corresponds to the control registers 82-0~82-N designated by the destination in the packet received by the reception unit 10, for example. The read address is created based on the control register number of the control registers 82-0~82-N.

The write address from the control unit 80 designates the output data registers 79-0~79-*m* which writes the write data. The write address of the output data registers 79-0~79-*m* corresponds to the control registers 82-0~82-N which is used by the reduction arithmetic operation of the write data. The write address is created based on the control register number of the control registers 82-0~82-N. The read address from the CPU 3 designates the output data registers 79-0~79-*m* which reads the read data.

The multiplexer 72 selects one of data from the input data registers 70-0~70-*m* and data from the reception unit 10 according to an indication of input selection from the control unit 80. The selected data is inputted to the storage unit 74 or the arithmetic unit 75 through the switch 73. The control unit 80 instructs the input selection to the multiplexer 842 to select the data from the reception unit 10 in the case that the synchronization signal and the destination are inputted from the reception unit 10 and to select the read data from the input data registers 70-0~70-*m* in the case except above case.

The switch 73 inputs the input from the multiplexer 72 or the arithmetic unit 75 to the storage unit 74 or the arithmetic unit 75 according to an instruction of input/output selection from the control unit 80. The control unit 80 controls the switch 73 to select data from the multiplexer 842 in the case that data is inputted from the multiplexer 72 and to select data from the arithmetic unit 75 in the case except above case. And the control unit 80 controls the switch 73 to output the input data to the arithmetic unit 845 in the case that the synchronization is established and to output the input data to the storage unit 844 in the case except above case.

The storage unit 74 stores data which is inputted through the multiplexer 72 and the switch 73. In this manner, the storage unit 74 stores data during the reduction arithmetic operation. The storage unit 74 stores data during the reduction arithmetic operation in an address designated by the write address from the control unit 80. The write address of the storage unit 74 corresponds to the control registers 82-0~82-N which are used for the reduction arithmetic operation. The control unit 80 creates the write address based on the control register number of the control registers 82-0~82-N.

The control unit 80 reads the data during the reduction arithmetic operation stored in the storage unit 74 to the arithmetic unit 75 according to the read address. The read address to the storage unit 74 corresponds to the control registers 82-0~82-N which are used for the reduction arithmetic operation. The control unit 80 creates the read address based on the control register number of the control registers 82-0~82-N.

The arithmetic unit 75 executes an arithmetic operation instructed from the control unit 80 between waiting data in the storage unit 74 and the data from the packet inputted through the multiplexer 72 or a previous result of the arithmetic operation when the synchronization is established. That is, the arithmetic unit 75 executes a designated arithmetic operation according to an arithmetic instruction from the control unit 80 and outputs the result of the arithmetic operation to the de-multiplexer 76 and the switch 73.

The arithmetic unit 75 executes an instructed arithmetic operation between data (a first data) inputted from the storage unit 74, data inputted from the input data registers 70-0~70-*m* and the data from the packet received by the reception unit 10 or a result (a second data) of the arithmetic operation that the arithmetic unit 75 executed at a previous stage. The control unit 80 creates the arithmetic instruction based on the value in the type register 84C which indicates a type of the operation.

The de-multiplexer 76 outputs the input from the arithmetic unit 75 to the output data registers 79-0~79-*m* or the transmission unit 12 according to an instruction of output selection from the control unit 80. The control unit 80 controls the de-multiplexer 76 to output data from the arithmetic unit 75 to the transmission unit 12 before the reduction arithmetic operation is completed, and to output the data from the arithmetic unit 75 to the output data registers 79-0~79-*m* when the reduction arithmetic operation is completed.

And the control unit 80 instructs the transmission of a second synchronization signal to the transmission unit 12 after the synchronization is established. In FIG. 13, the instruction is represented by the "packet transmission instruction". And the control unit 80 instructs a predetermined reduction arithmetic operation to the reduction arithmetic unit 84. The transmission unit 12 transmits the result of the reduction arithmetic operation in the arithmetic unit 75 with a second synchronization signal to the network 2 when receiving the transmission instruction of the second synchronization signal.

(A Second Embodiment of the Reduction Arithmetic Operation)

Figure 14:
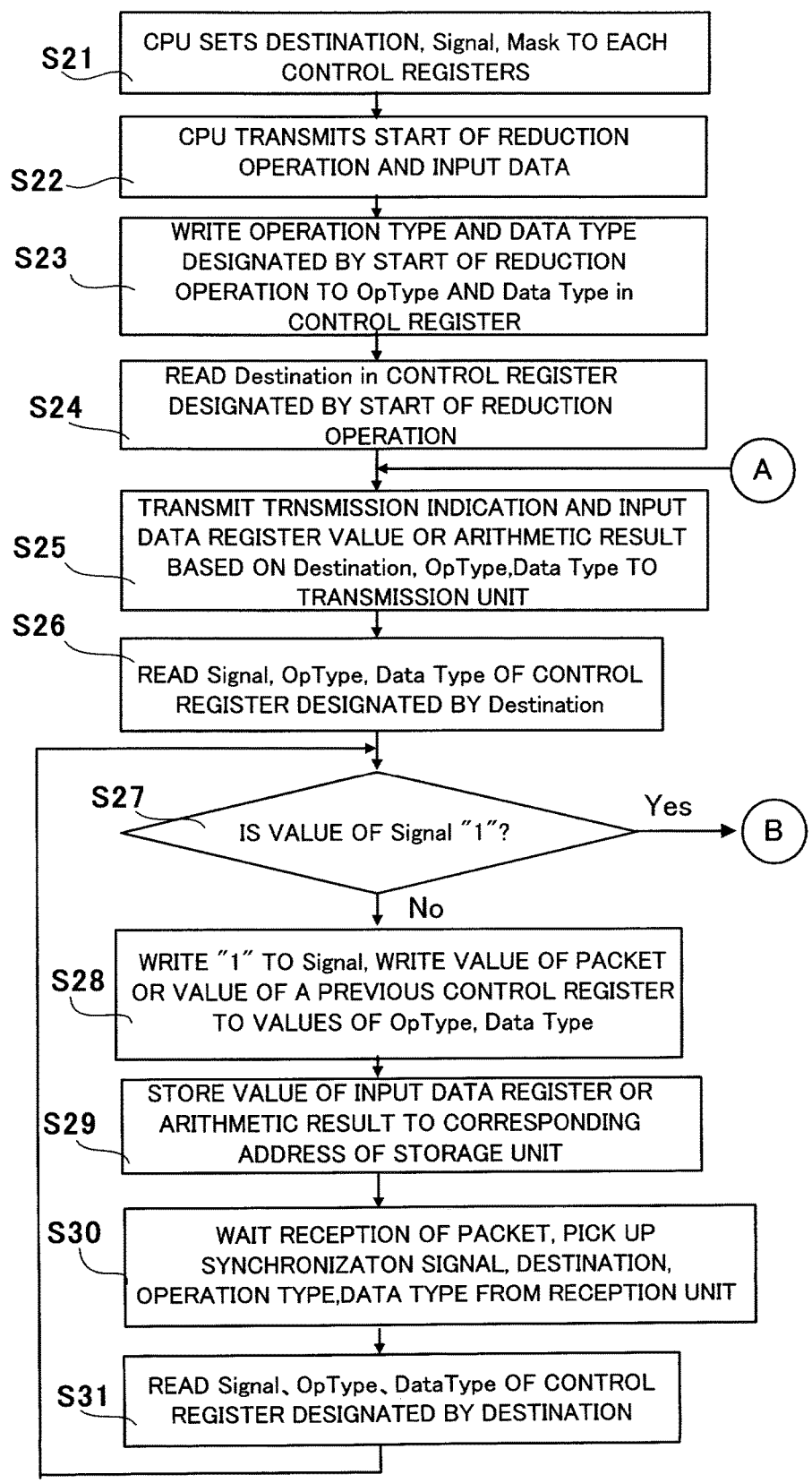
FIG. 14 is a diagram illustrating a first flow chart of the reduction operation process according to FIG. 13.
Figure 15:
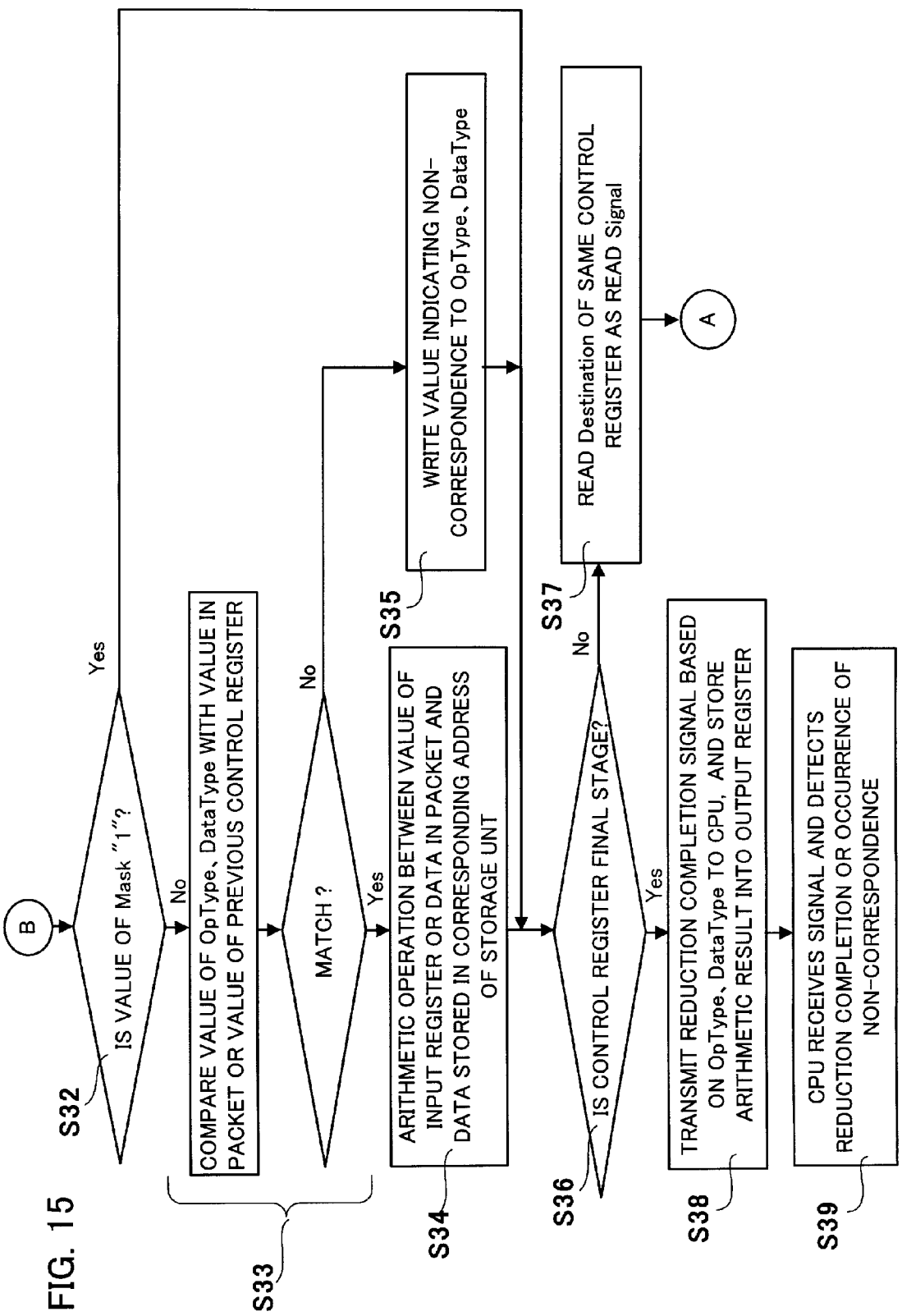
FIG. 15 is a diagram illustrating a second flow chart of the reduction operation process according to FIG. 13.

FIG. 14 and FIG. 15 illustrate diagrams of processing flow of the reduction arithmetic operation according to the second embodiment.

(S21) Before executing the reduction arithmetic operation, the CPU 3 writes the transmission destination to the destination register 84B (represented by sign "Destination" in FIG. 13) in each control registers 82-0~82-N in the synchronization unit 8 of the reduction operation device. That is, the CPU 3 sets the node address and the control register number corresponding to next stage which is determined by the algorithm of the reduction arithmetic operation such as the butterfly to the destination register 84B. And the CPU 3 writes the setting value to the signal register 84A and the mask register 84E of each control register 82-0~82-N in the synchronization unit 8 of the reduction operation device.

(S22) The CPU 3 transmits an input data to the input data registers 70-0~70-*m* and a signal indicating a start of the reduction arithmetic operation to the synchronization unit 8 in order to start the reduction arithmetic operation. The signal indicating a start of the reduction arithmetic operation include the input register number, the control register number corresponding to a first stage, the operation type and the data type.

(S23) The control unit 80 of the synchronization unit 8 writes the operation type, the data type to the operation type register 84C and the data type register 84D in the control register of the control register number designated by the signal indicating a start of the reduction arithmetic operation when receiving the signal indicating a start of the reduction arithmetic operation. In FIG. 13, the operation type register 84C is represented to add the sign "Op Type" and the data type register 84D is represented to add the sign "Data Type".

(S24) The control unit 80 of the synchronization unit 8 reads the value in the destination register (Destination) 84B in the control registers 82-0~82-N designated by the signal indicating a start of the reduction arithmetic operation after writing to the control register.

(S25) The control unit 80 judges whether the value of destination register 84B designates its own node or the other node. The control unit 80 transmits the data and a signal indicating the transmission of the packet to the transmission unit 12 when the value of the destination register 84B designates the other node. The data which is transmitted to the transmission unit 12 is a value stored in the input data register 70-0 when a first stage is designated to the designated control register. And the data which is transmitted to the transmission unit 12 is a result of the arithmetic from the arithmetic unit 75 when a succeeding stage is designated to the designated control register. The control unit 80 instructs a bypass as the arithmetic instruction to the arithmetic unit 75 when the value in the input data register 70-0 is transmitted to the transmission unit 12. As illustrated in FIG. 7, the signal indicating the transmission of the packet from the control unit 80 includes the node address which is a transmission destination, a transmission destination control register number, an operation type and data type. The transmission unit 12 creates the packet based on the data and above signal indicating the transmission as illustrated in FIG. 7 and transmits the packet to the network 2.

(S26) When the control unit 80 judged that the value of destination register 84B has designated its own node, the control unit 80 reads the value in the signal register 84A of the control register that is designated by the destination register 84B to transmit the synchronous signal to its own synchronization unit 8. And the control unit 80 reads the values in the operation type register 84C and the data type register 84D to detect a non-correspondence.

(S27) The control unit 80 judges whether the synchronization is established from the value of signal register 84A. The control unit 80 judges that the synchronization is established when the value "1" is set to the signal register 84A. While, the control unit 80 judges that the synchronization is not established when the value "1" is not set to the signal register 84A.

(S28) When the control unit 80 judged that the synchronization was not established, the control unit 80 writes the value "1" to the signal register 84A and writes the operation type and the data type to the operation type register 84C and the data type register 84D respectively. The values of the operation type and the data type are the value in the packet or the value of the control register at a previous time. That is, when the steps 37, S25 and S26 are executed just immediately, the values that are written are the value in step S37 or the values of the operation type and the data type that are read from the control register in step S25. In contrary, when the processes in steps S30 and S31 are execute just immediately, the values that are written are the value in the packet that is received in step S30.

(S29) The control unit 80 stores the data into the address position corresponding control register of the data storage unit 74. When the control register 82-0 indicates a first stage, the value in the input register 70-0 is stored as data, and when the control register indicates a succeeding stage, an arithmetic result at a previous stage is stored.

(S30) The control unit 80 waits a reception of the packet. When the reception unit 10 receives the packet from the network 2, the reception unit 10 picks up data, the synchronization signal, the destination, the operation type and the data type from the received packet and transmits them to the multiplexer 72 and the synchronization unit 8.

(S31) When the control unit 80 receives the signals from the reception unit 10, the control unit 80 reads the signal in the signal register 84A, the operation type in the operation type register 84C and the data type in the data type register 84D of the control register designated by the destination. And the control unit 80 returns the processing in step S27 and repeats the processing from step S27 to step S31 until the synchronization is established.

(S32) When the control unit 80 judges that the synchronization is established in the judgment of step S27, the control unit 80 judges the value of the mask register 84E of the control register 82-0~82-*m*. As above described, the mask register 84E is provided for preventing the detection of the non-correspondence and the arithmetic operation when the mask register 84E is effective (the value "1") even though the synchronization is established. In this manner, in step S21, the mask register 84E is set to effective for the control register of which is added when rounding toward the power of 2, such as the control register 82-4 of the node #3 explained in FIG. 12. The control unit proceeds to step S36 for the control register judged that the value of the mask register 84E is "1" (effective).

(S33) The control unit 80 detects non-correspondence of the operation type and the data type for the control register judged that the value of the mask register 84E is not "1" (not effective). The detection of the non-correspondence is executed by comparing the operation type in the operation type register 84C and the data type in the data type register 84D of the control registers 82-0~82-*m* with the operation type and the data type. The values of the operation type and the data type are the value of the operation type and the data type read from the control register in step S37 or step S25, when the steps 37, S25 and S26 are executed just immediately. In contrary, when the processes in steps S30 and S31 are execute just immediately, the values of the operation type and the data type are the value in the packet that is received in step S30. The control unit 80 judges that the non-correspondence occurs when detecting un-match of the values or detecting the non-corresponding value among the compared values by the comparison. While, the control unit 80 judges that non-correspondence does not occur when detecting the match of the values by the comparison.

(S34) When judging that non-correspondence does not occur, the arithmetic operation is executed. The target data of the arithmetic operation is one of (1) the value in the input data register 70-1 when the control register corresponds to just next stage after the first stage, (2) the data in the packet when the control register corresponds to the later stage and a factor of the establishment of the synchronization is a synchronization signal from the packet, and (3) the arithmetic result at a previous stage when the factor of the establishment of the synchronization is a synchronization signal from the synchronization unit of its own. The arithmetic unit 75 executes the arithmetic operation between any one data of above (1), (2) and (3) and the data in an address, which corresponds to the control register that the synchronization is established, of the storage unit 74.

(S35) In contrary, when judging that non-correspondence occurs, the control unit 80 writes the value indicating the non-correspondence to the arithmetic operation register 84C and the data type register 84D in the control registers 82-0~82-*m*.

(S36) The control unit 80 judges whether the control register that the synchronization is established corresponds to a final stage.

(S37) When the control unit 80 judges that the control register that the synchronization is established does not correspond to the final stage, the control unit 80 reads the value in the destination register 84B of the control register that includes the signal register 84A of which is read in step S27. The control unit 80 returns to the step S25 in FIG. 14.

(S38) When the control unit 80 judges that the control register that the synchronization is established corresponds to the final stage, the control unit 80 sends a signal indicating the completion of the reduction operation based on the values of the operation type register 84C and the data type register 84D to the CPU 3. And the control unit 80 stores the arithmetic result of the arithmetic unit 75 into the output data registers 79-0~79-*m*. The signal indicating the completion of the reduction operation has information whether there is non-correspondence, because the signal indicating the completion of the reduction operation is created based on the value of the operation type register 84C and the data type register 84D. In this manner, when the values of the operation type register 84C and the data type register 84D indicate the non-correspondence, the control unit 80 notifies the non-correspondence with the signal indicating the completion of the reduction operation to the CPU 3.

(S39) The CPU 3 receives the signal indicating the completion of the reduction operation and detects the completion of the reduction operation or the occurrence of the non-correspondence.

As above described, it is possible to judge the non-correspondence before the arithmetic operation at the establishment of the synchronization, because the control unit 80 judges the correspondence of the operation type and the data type of the plurality of arithmetic data (that is, control registers) at the timing of the establishment of the synchronization. Therefore, it is prevented to cause the hang-up and error arithmetic processing. In this embodiment, both correspondences of the operation type and the data type are detected, but any one of correspondences of the operation type and the data type may be detected.

When the number of nodes is not a power of 2 for one processing, the control register, of which the additional node added when rounding toward the power of 2 has, is provided to the other nodes. The mask register 84E of the control register is set the value "1" and the signal register 84A of the control register is set the value "1". The reason that the value "1" is set to the signal register 84A is for controlling that the control register 82-3 receives only one synchronization signal. After the value of the signal register 84A becomes "1", the value of the mask register 84E is judged. When the value of the mask register 84E indicates "1", the detection of the non-correspondence and the arithmetic operation are not executed. Therefore, it is possible to detect the non-correspondence even though the control register, of which the additional node added when rounding toward the power of 2 has, is provided to the other node when the number of nodes is not a power of 2 for one processing.

(A Third Embodiment of the Reduction Operation)

FIG. 16 illustrates a diagram of an explanation of the reduction arithmetic operation according to a third embodiment. FIG. 16 illustrates a variety example of the packet format in FIG. 5 and FIG. 6. As illustrated in FIG. 16, the packet includes a format of a transmission destination node address, a transmission destination control register number, an operation type and data type. Further, in the third embodiment, Field is added to the packet format. Columns for notify a node address which occurred the non-correspondence and a control register number which occurred the non-correspondence are provided to the additional field.

In the third embodiment, the construction of the nodes is same construction as FIG. 2. And the construction of the reduction operation device is same construction as FIG. 6.

When the control unit 80 detects the non-correspondence of the operation type and the data type in step S12 of the processing flow illustrated in FIG. 9, the control unit 80 sets its own node address and the control register number which is read to the node address and the control register number in the additional field of the packet illustrated in FIG. 16.

Further, when the non-correspondence is occurred in step S17 of the processing flow illustrated in FIG. 9, the control unit 80 writes the value of the additional field of the packet illustrated in FIG. 16 to the output register and notifies the node address and the control register number, of which the non-correspondence are occurred, to the CPU 3. The other processing are same as the processing flow illustrated in FIG. 8 and FIG. 9 of the first embodiment.

In this manner, it is possible to easy debug, because the both the node and the control register of which the non-correspondence is occurred are notified when the reduction operation device notifies the non-correspondence.

Other Embodiments

In the above embodiment, the butterfly algorithm is explained as an example of the barrier synchronization of the parallel processing. It may also be applied to other algorithm such as an algorithm of pair wise exchange with recursive doubling transferring operations.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A reduction operation device to which is inputted a plurality of sets, each set including a first synchronization signal and data, from a plurality of nodes and that executes a reduction operation of a plurality of the data, the reduction operation device comprising:
   a synchronization unit that judges whether a synchronization between a plurality of the first synchronization signals of the plurality of sets is established from inputs of the plurality of first synchronization signals, outputs an instruction of the reduction operation of the plurality of data to an arithmetic unit after the synchronization between the plurality of first synchronization signals is established, and instructs an output of an arithmetic result of the reduction operation to m, wherein m>1 and m is an integer, number of transmission destination nodes, which are set corresponding to a next stage of the reduction operation, to a transmission unit after the synchronization between the plurality of first synchronization signals is established;
   the arithmetic unit that executes an arithmetic operation between n, wherein n>1 and n is an integer, number of data of the synchronization;
   a storage unit that stores the plurality of data and the arithmetic result from the arithmetic unit;
   the transmission unit that transmits the arithmetic result and the plurality of second synchronization signals to the m number of transmission destination nodes designated by the synchronization unit; and
   a reception unit that sends the plurality of first synchronization signals to the synchronization unit and sends the plurality of data to the storage unit,
   wherein the synchronization unit receives the plurality of first synchronization signals and at least one of an operation type and a data type included in the inputted instruction of the reduction operation, compares between the n number of the operation type or the data type after the synchronization is established, transmits a signal indicating non-correspondence instead of the arithmetic result to the m number of transmission destination nodes when the n number of the operation type or the data type do not match, and executes to output the instruction of the reduction operation of the plurality of data when the n number of the operation type or the data type match, and
   wherein the reduction operation device further comprises a mask register provided for each of the plurality of the synchronization units, and
   the synchronization unit prohibits the comparing between the n number of the operation type or the data type and the executing of the instruction of the reduction operation when the mask register indicates an effective value.

2. The reduction operation device according to claim 1, wherein the synchronization unit transmits the signal indicating the non-correspondence and an identification number of the synchronization unit that occurs the non-correspondence through the transmission unit.

3. The reduction operation device according to claim 1, wherein the synchronization unit further comprises:
   a plurality of control registers that each stores respective first synchronization signal from the plurality of first synchronization signals, an address of the transmission destination node and at least one of the operation type and the data type; and
   a control unit that judges that whether the synchronization is established based on the plurality of first synchronization signals, compares at least one of the inputted operation type and the inputted data type included in the inputted instruction of the reduction operation with at least one of the stored operation type and the stored data type in the storage unit and detects the non-correspondence based on the comparing result.

4. The reduction operation device according to claim 1, wherein the synchronization unit refers to the mask register after the synchronization is established and prohibits the comparing between the n number of the operation type or the data type and the executing of the instruction of the reduction operation when the mask register indicates an effective value.

5. The reduction operation device according to claim 1, wherein the synchronization unit transmits the signal indicating non-correspondence instead of the arithmetic result to at least one transmission destination node that has inputted the inputted data when the comparing result is not favorable.

6. A processor comprising:
   a processing unit; and
   a reduction operation device to which is inputted a plurality of sets, each set including a first synchronization signal and data, from a plurality of nodes and that executes a reduction operation of a plurality of the data,
   wherein the reduction operation device comprises:
   a synchronization unit that judges whether a synchronization between a plurality of the first synchronization signals of the plurality of sets is established from inputs of the plurality of first synchronization signals, outputs an instruction of the reduction operation of the plurality of data to an arithmetic unit after the synchronization between the plurality of first synchronization signals is established, and instructs an output of an arithmetic result of the reduction operation to m, wherein m>1 and m is an integer, number of transmission destination nodes, which are set corresponding to a next stage of the reduction operation, to a transmission unit after the synchronization between the plurality of first synchronization signals is established;
   the arithmetic unit that executes an arithmetic operation between n, wherein n>1 and n is an integer, number of data of the synchronization;
   a storage unit that stores the plurality of data and the arithmetic result from the arithmetic unit;
   the transmission unit that transmits the arithmetic result and the plurality of second synchronization signals to the m number of transmission destination nodes designated by the synchronization unit; and
   a reception unit that sends the plurality of first synchronization signals to the synchronization unit and sends the plurality of data to the storage unit,
   wherein the synchronization unit receives the plurality of first synchronization signals and at least one of an operation type and a data type included in the inputted instruction of the reduction operation, compares between the n number of the operation type or the data type after the synchronization is established, transmits a signal indicating non-correspondence instead of the arithmetic result to the m number of transmission destination nodes when the n number of the operation type or the data type do not match, and executes to output the instruction of the reduction operation of the plurality of data when the n number of the operation type or the data type match, and
   wherein the reduction operation device further comprises a mask register provided for each of the plurality of the synchronization units, and the synchronization unit prohibits the comparing between the n number of the operation type or the data type and the executing of the instruction of the reduction operation when the mask register indicates an effective value.

7. The processor according to claim 6, wherein the synchronization unit transmits the signal indicating the non-correspondence and an identification number of the synchronization unit that occurs the non-correspondence through the transmission unit.

8. The processor according to claim 6, wherein the synchronization unit further comprises:
   a plurality of control registers that each stores respective first synchronization signal from the plurality of first synchronization signals, an address of the transmission destination node and at least one of the operation type and the data type; and
   a control unit that judges that whether the synchronization is established based on the plurality of first synchronization signals, compares at least one of the inputted operation type and the inputted data type included in the inputted instruction of the reduction operation with at least one of the stored operation type and the stored data type in the storage unit and detects the non-correspondence based on the comparing result.

9. The processor according to claim 6, wherein the synchronization unit refers to the mask register after the synchronization is established and prohibits the comparing between the n number of the operation type or the data type and the executing of the instruction of the reduction operation when the mask register indicates an effective value.

10. The processor according to claim 6, wherein the synchronization unit transmits the signal indicating non-correspondence instead of the arithmetic result to at least one transmission destination node that has inputted the inputted data when the comparing result is not favorable.

11. A computer system comprising:
    a plurality of processors that are connected through a network, each processor comprising:
    a processing unit; and
    a reduction operation device to which is inputted a plurality of sets, each set including a first synchronization signal and data, from a plurality of nodes and that executes a reduction operation of a plurality of the data,
    wherein the reduction operation device comprises:
    a synchronization unit that judges whether a synchronization between a plurality of the first synchronization signals of the plurality of sets is established from inputs of the plurality of first synchronization signals, outputs an instruction of the reduction operation of the plurality of data to an arithmetic unit after the synchronization between the plurality of first synchronization signals is established, and instructs an output of an arithmetic result of the reduction operation to m, wherein m>1 and m is an integer, number of transmission destination nodes, which are set corresponding to a next stage of the reduction operation, to a transmission unit after the synchronization between the plurality of first synchronization signals is established;
    the arithmetic unit that executes an arithmetic operation between n, wherein n>1 and n is an integer, number of data of the synchronization;
    a storage unit that stores the plurality of data and the arithmetic result from the arithmetic unit;
    the transmission unit that transmits the arithmetic result and the plurality of second synchronization signals to the m number of transmission destination nodes designated by the synchronization unit; and
    a reception unit that sends the plurality of first synchronization signals to the synchronization unit and sends the plurality of data to the storage unit,
    wherein the synchronization unit receives the plurality of first synchronization signals and at least one of an operation type and a data type included in the inputted instruction of the reduction operation, compares between the n number of the operation type or the data type after the synchronization is established, transmits a signal indicating non-correspondence instead of the arithmetic result to the m number of transmission destination nodes when the n number of the operation type or the data type do not match, and executes to output the instruction of the reduction operation of the plurality of data when the n number of the operation type or the data type match, and
    wherein the reduction operation device further comprises a mask register provided for each of the plurality of the synchronization units, and
    the synchronization unit prohibits the comparing between the n number of the operation type or the data type and the executing of the instruction of the reduction operation when the mask register indicates an effective value.

12. The computer system according to claim 11, wherein the synchronization unit transmits the signal indicating the non-correspondence and an identification number of the synchronization unit that occurs the non-correspondence through the transmission unit.

13. The computer system according to claim 11, wherein the synchronization unit further comprises:
    a plurality of control registers that each stores respective first synchronization signal from the plurality of first synchronization signals, an address of the transmission destination node and at least one of the operation type and the data type; and
    a control unit that judges that whether the synchronization is established based on the plurality of first synchronization signals, compares at least one of the inputted operation type and the inputted data type included in the inputted instruction of the reduction operation with at least one of the stored operation type and the stored data type in the storage unit and detects the non-correspondence based on the comparing result.

14. The computer system according to claim 11, wherein the synchronization unit refers to the mask register after the synchronization is established and prohibits the comparing between the n number of the operation type or the data type and the executing of the instruction of the reduction operation when the mask register indicates an effective value.

15. The computer system according to claim 11, wherein the synchronization unit transmits the signal indicating non-correspondence instead of the arithmetic result to at least one transmission destination node that has inputted the inputted data when the comparing result is not favorable.

* * * * *